(12) United States Patent
Bhowmick et al.

(10) Patent No.: US 9,448,693 B2
(45) Date of Patent: Sep. 20, 2016

(54) SYSTEM FOR NAVIGATION IN A COMPUTER USER INTERFACE

(71) Applicant: Oracle International Corporation, Redwood Shores, CA (US)

(72) Inventors: Arin Bhowmick, Fremont, CA (US); Harris Kravatz, Danville, CA (US); Daniel Schwartz, San Francisco, CA (US); Aylin Uysal, San Francisco, CA (US); Roy Selig, Princeton, NJ (US); Katie Candland, San Francisco, CA (US); Allison Farrell, Revere, MA (US); Sally Stratton Baggett, Healdsburgh, CA (US); Samuel Ting, Cupertino, CA (US); Jeremy Ashley, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 386 days.

(21) Appl. No.: 13/843,126

(22) Filed: Mar. 15, 2013

(65) Prior Publication Data
US 2014/0123072 A1    May 1, 2014

Related U.S. Application Data

(60) Provisional application No. 61/707,221, filed on Sep. 28, 2012.

(51) Int. Cl.
*G06F 3/0482* (2013.01)
*G06F 3/0481* (2013.01)
*G06F 3/0484* (2013.01)

(52) U.S. Cl.
CPC ......... *G06F 3/0482* (2013.01); *G06F 3/04817* (2013.01); *G06F 3/0481* (2013.01); *G06F 3/0484* (2013.01)

(58) Field of Classification Search
CPC . G06F 3/04817; G06F 3/0482; G06F 3/0484
USPC ......................................................... 715/838
See application file for complete search history.

(56) References Cited

U.S. PATENT DOCUMENTS

| | | | |
|---|---|---|---|
| 2001/0056434 A1* | 12/2001 | Kaplan et al. | 707/104.1 |
| 2003/0098891 A1* | 5/2003 | Molander | 345/841 |
| 2003/0187586 A1* | 10/2003 | Katzenmaier | A61L 2/24 702/19 |
| 2004/0117235 A1* | 6/2004 | Shacham | 705/10 |
| 2004/0212640 A1* | 10/2004 | Mann et al. | 345/792 |
| 2009/0013048 A1* | 1/2009 | Partaker | G06Q 10/107 709/206 |
| 2009/0132943 A1* | 5/2009 | Minsky | G06Q 10/0637 715/767 |
| 2009/0319897 A1* | 12/2009 | Kotler et al. | 715/711 |
| 2010/0107123 A1* | 4/2010 | Sareen | G06F 3/0481 715/835 |
| 2011/0041177 A1* | 2/2011 | Pereira | 726/20 |
| 2011/0055754 A1* | 3/2011 | Nicholas et al. | 715/810 |
| 2012/0139949 A1* | 6/2012 | Ohba | G06F 3/04892 345/660 |
| 2012/0188209 A1* | 7/2012 | Kaido | G01C 21/367 345/204 |
| 2012/0296959 A1* | 11/2012 | Momchilov | G06F 9/54 709/203 |
| 2013/0198662 A1* | 8/2013 | Salmen et al. | 715/765 |

* cited by examiner

*Primary Examiner* — Tuyetlien T Tran
*Assistant Examiner* — David Spellman
(74) *Attorney, Agent, or Firm* — Trellis IP Law Group, PC

(57) ABSTRACT

Embodiments described herein provide various features for a unified and simplified user experience. A first feature (or set of features) provides icons for launching or accessing applications and business flows. A second feature provides a unified menu system including an icon bar with thumbnails of a selected icon arranged adjacent to the icon bar. A third feature provides a framework for a menu that can expose application objects from diverse sources.

13 Claims, 24 Drawing Sheets

Manager Dashboard

Alerts
- You have been granted a new role for a compensation cycle. 5/23/2011
- Annual Evaluation Due on 5/20/2011 for Basil Reid
- Membership - Society for Information Mgmt - Expires on 5/25/2011 for Paulette Thomas
- License/Certificate – CCIE – Expires on 5/26/2011 for Basil Reid
- Annual Evaluation Due on 5/31/2011 for Jane Doe View All

Pending Approvals  Personalize

| Approval | Name | Effective Date | Approval Receipt Date |
|---|---|---|---|
| Promotion | John Smith | 05/18/2011 | 05/18/2011 |
| Reporting Change | Jane Doe | 05/12/2011 | 05/12/2011 |
| Transfer | Bob Jones | 05/18/2011 | 05/18/2011 |

Direct Line Reports

Personalize Find | View All | 1-10 of 13

| Employees | Summary | Contact | Career P. | Compen | Performa | Leave | Successi |
|---|---|---|---|---|---|---|---|
| Name | | | Empl ID | Job Code | Job Title | | |
| Jane Doe | ▶ Actions | | KU0035 | KU0035 | Sr Manager | | |
| John Smith | ▶ Actions | | KU0172 | KU0172 | Director | | |
| Bob Jones | ▶ Actions | | KU0066 | 600110 | Director | | |

View My Organization

Objective Alignment

2009 Objectives For Corporate Accounting
01/01/2009 to 12/31/2009

*Section [Profitability ▼]

[bar chart with values 2, 3, 4, 5, 6]

Company Directory

Search by Name, JobTitle, Department, or Email
[_____] Advanced Search

My Org Chart

My Job Openings

Find | View All

| Job | Job Title | Open | In Process |
|---|---|---|---|
| 994468 | Eban Director | 0 | 2 |
| 503706 | Clerical Assistant Medical Claims | 591 | 0 |
| 500416 | Administrative Assistant | 0 | 0 |
| 500415 | Administrative Assistant | 0 | 0 |
| 500414 | Administrative Assistant | 0 | 0 |

Browse Job Openings
Create Job Opening

Quick Links

Recents | Help | Settings | Jamie Frost v2.2

Career

Career Planning

Career Statement  [Edit]

My career mission is to build a network of companies related to this field, which will contribute to the development and wide spread usage of the company's software packages.

My Desired Preferences

- Job Family  Operations
- Location  Europe
- Career Plan  Next career move in 3 years
- Comments  Interested in sales or program management role.

Career of Interest  [Add]

| Position | Added By | Your Skill Compatability | Privacy |
|---|---|---|---|
| Director of Sales | me | 40% | 🔒 |
| Director of HCM | me | 80% | 🔒 |
| Director of Logistics | Jane Doe | 75% | 🔒 |

1 – 3 of 6

Top Career That Matches Your Skills    See All

Senior Consultant   ✕

Compatibility 99%
Department Research and Development

The Senior Consultant role is mainly responsible for guiding and assisting all sales agents in the Asia-Pac region. Primary duties include checking Add to Careers of Interest

*Figure 22*

| Customers | | | | |
|---|---|---|---|---|
| Show My Customers ▼ | | | | Create ▼ |
| Name | Address | | Industry | Company Contact |
| Acme Inc. | | | Retail | |
| Adv Corp | | | Insurance | |
| Banana | | | Retail | |
| Brady | | | High-Tech | |
| Hal, Inc. | | | Retail | |
| Imagine Industries | | | High-Tech | |
| LC Enterprise | | | High-Tech | |
| Reston Wrestling | | | Healthcare | |
| Symtech Corp. | | | High-Tech | |
| UltraTech | | | High-Tech | |

*Figure 24*

Edit Customers: Profile    560 — Action ▼   Save and Close   Cancel
                                562 — More Details
                                      Follow

Basic Information

Company Corp

Enterprise ☑
ADVC
June ☑

+1 ☑ 650 555 1234
info@company.com
www.company.com
☐ Legal Enity

Address

United States ☑

Portland
OR
97236

Primary Contact

Jane Doe ☑
+1 650 555 1234
jdoe@company.com

Sales Account

Jack Sprat ☑
11/14/2011

*Figure 25*

Customers

> Tasks
> Quick Create
> Search

Customer Center

1000 First Street, Suite 300,
Portland, OR 97232

> Search in Customer

Actions ▼ View ▶
☑ Customer Information
  Snapshot
  Profile
  OneSource
  Organization Chart
  Sales Account Team
  Billing Accounts
  Subcultures
  Classifications
  Tasks
  Interactions
  Notes
  Appointments
  Discussion Forums
  Competitive Presence
  Responses
  Contacts
☑ Sales
  Assessments
  Recommendations
  Leads
  Opportunities
  Revenue Lines
  Revenue Lines

Edit Customer: Company Corp (Portland, US): Profile Actions ▼   [Save] [Save and Close] [Cancel]

⊘ Tags Follow

Basic Information ⓘ

Name ═══ Company Corp

Address 1000 First Street, Suite 300,
        Portland, OR 97232

Customer Details Show More

═══ ▼
═══ Portland, US
═══
═══ ◀▶

> Additional Names

✓ Customer Type
  ✓ Legal Entity
  ☑ Sales Account
  ☐ Sales Prospect
  ═══ None ✚

Personal Contact  Jane Doe
Phone  +1 650 555 1234
Email  jdoe@company.com

◀▶

Privately Owned
Minority Owned
Email Business

▶

♂

✓ Sales Account

Named Sales Account
═══ John Smith
═══ 11/14/2011

Jane Doe

SYSTEM FOR NAVIGATION IN A COMPUTER USER INTERFACE

CROSS REFERENCES TO RELATED APPLICATIONS

This application claims priority from U.S. Provisional Patent Application Ser. No. 61/707,221, entitled SYSTEM FOR NAVIGATION IN A COMPUTER USER INTERFACE, filed on Sep. 28, 2012, which is hereby incorporated by reference as if set forth in full in this application for all purposes.

SUMMARY

Embodiments described herein provide various features for a unified and simplified user experience. A first feature (or set of features) provides icons for launching or accessing applications and business flows. A second feature provides a unified menu system including an icon bar with thumbnails of a selected icon arranged adjacent to the icon bar. A third feature provides a framework for a menu that can expose application objects from diverse sources.

A further understanding of the nature and the advantages of particular embodiments disclosed herein may be realized by reference of the remaining portions of the specification and the attached drawings.

BRIEF DESCRIPTION OF THE DRAWINGS

FIG. 8 shows a view of a dashboard;
FIG. 21 shows an "Expenses" page;
FIG. 22 shows a "Career Planning" page;
FIG. 24 shows a file system interface;
FIG. 25 shows the display after the user has clicked on an entry;
and
FIG. 26 shows an application screen.

DETAILED DESCRIPTION OF EMBODIMENTS

Users of enterprise software applications may frequently need to access a broad variety of products and tools to complete business flows and tasks. These Enterprise Resource Planning (ERP) and transactional tools may be served from local or remote (e.g., Internet or "cloud"-based) sources, and can include separate pillar services such as Human Capital Management (HCM), Customer Relationship Management (CRM), Supply Chain Management (SCM), and others.

End users of enterprise applications may encounter long navigation flows to accomplish relatively simple tasks. These flows may require multiple links, deep hierarchies, and deeply branched decision trees. As a result, users may make errors and become frustrated as they spend too much time completing tasks. It is desirable to provide a user interface that makes improvements in areas such as one or more of end user intuition, efficiency, productivity, etc., Embodiments described herein provide various features for a unified and simplified user experience. Although multiple features may be described together, it should be apparent that features can be used alone or in concert with other features whether the other features are disclosed in this application or exist elsewhere. In one embodiment, a "unified-menu" solution can apply to both gesture based mobile devices, desktop based devices using a cursor or other pointing device, voice commands, data glove or other means of input and control for generalized computing devices. Televisions, music players, game consoles, personal digital assistants, phones and any other suitable mobile or static platform or device could be adapted for use with one or more of the features disclosed herein.

This application describes three basic categories of features. In general, any suitable implementation of the features may be acceptable including local or remote processing, or a combination of both local and remote processing. Features or characteristics thereof may be combined across categories. Not all features need be used in a particular embodiment. In some embodiments features may be used in a modified form that is different from what is described. Any one or more features may be used and some features may be used by themselves as standalone features, depending upon the implementation.

Enterprise Bar

Figure 1:
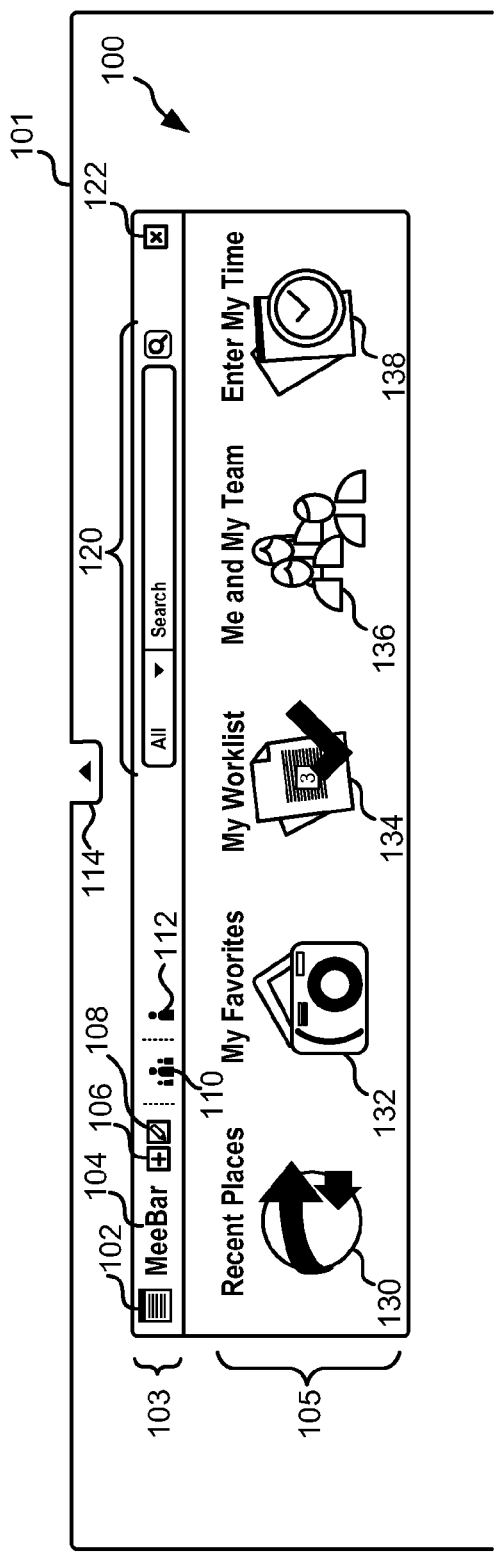
FIG. 1 is a first illustration of a navigation bar.

FIGS. 1-12 illustrate various embodiments of a navigation bar. The navigation bar is also referred to as an "enterprise bar," "eBar," or, as in the Figures, "MeeBar." FIG. 1 shows MeeBar 100 displayed along a top edge 101 of a window or other screen portion on a display of a computer system. MeeBar 100 includes controls at 103 and icon buttons at 105. MeeBar controls include menu button 102, icon add button 106, icon edit button 108, manager view button 110, employee view button 112, search controls 120 and close button 122. Icon buttons at 105 include icon buttons for "Recent Places" 130, "My Favorites" 132, "My Worklist" 134, "Me and My Team 136, and "Enter My Time" 138. The label at 104 identifies the navigation bar 100 as a "MeeBar." Hide button 114 is located outside of the MeeBar at the top edge of the window (or other display area). The hide button can remove the MeeBar from view, if desired, and also reveal the MeeBar so that it is again visible by clicking on, or otherwise activating, hide button 114 as is known in the art.

It should be apparent that although specific types of controls are shown, other embodiments may use different types of controls to implement the functionality described herein. For example, although buttons may be shown, the functionality can be invoked with other types of controls such as a slider, knob, radio button, link, hyperlink, menu, list, etc. In general, any type of control, whether software, hardware or a combination of both, can be used. Further, different types of devices may be used so that user selection can be by any suitable input device such as a mouse and pointer, keyboard, trackpad, touchpad, touchscreen, eye recognition, biometric, image or other electromagnetic sensing, etc. In any of these various embodiments, the functions may be invoked by user hand movement, finger or digit manipulation, eye or other physical movement, voice recognition, etc. The interface can be 2 dimensional, or 3 dimensional. Any suitable type of input and/or output devices can be employed. Any suitable components of a computing system can be used with embodiments of the invention.

Figure 2:
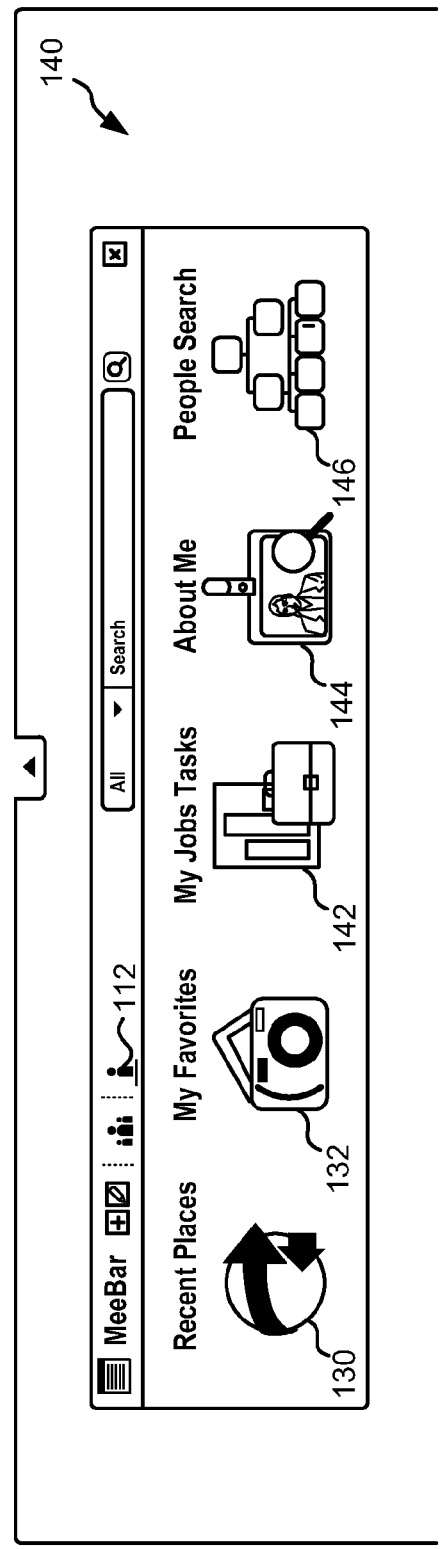
FIG. 2 is a second illustration of a navigation bar.

FIG. 2 shows a slightly different MeeBar arrangement that is shown when a user has selected employee button 112 rather than the manager button 110 that corresponds with the MeeBar arrangement of FIG. 1. In FIG. 2, if the employee view is selected then some of the icon buttons are changed from those shown in the manager view. For example, in FIG. 2, icon buttons "My Job Tasks" 142, "About me" 144 and "People Search" 146 on MeeBar 140 are shown replacing the corresponding buttons from FIG. 1 of "My Worklist" 134, "Me and My Team" 136 and "Enter My Time" 138. Although these two different views are discussed below, it should be apparent that other different views can be created depending upon the implementation. More than two different views can be provided and can be selected by the user, as desired. The different views can also have icon buttons in common as icon buttons "Recent Places" 130 and "My Favorites" 132 are shown to be in common with the Mee-Bars of FIGS. 1 and 2. If the user is a manager then they typically have two different roles and views as provided by buttons 110 and 112. A non-manager employee would typically only be provided with the MeeBar of FIG. 2 which does not provide manager controls.

FIGS. 3-8 are next discussed to illustrate activation of the icon buttons in the MeeBar of FIG. 1.

Figure 3:
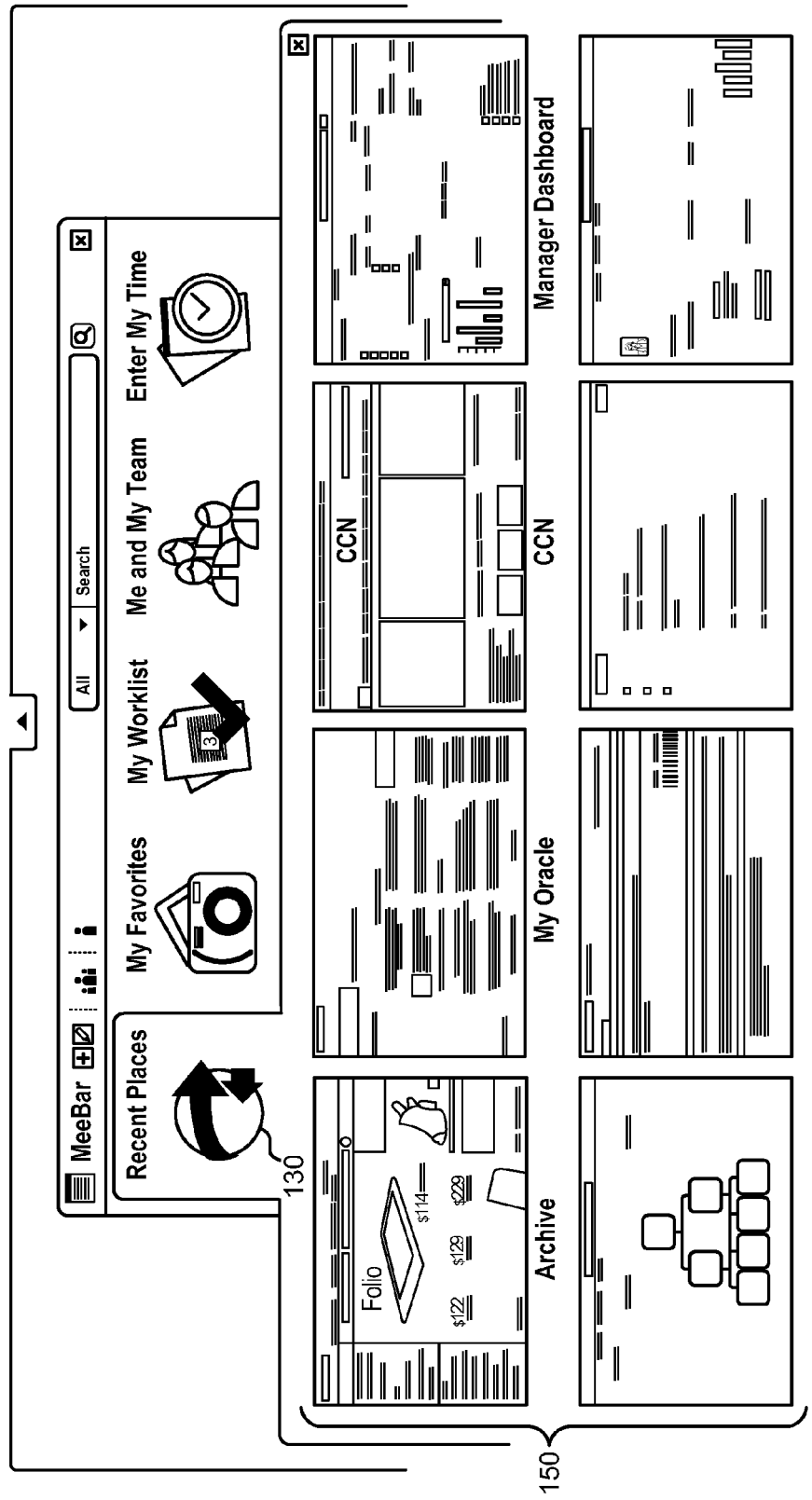
FIG. 3 is a third illustration of a navigation bar.

In FIG. 3, the user has activated icon button 130. As a result, a grid or array of thumbnail images 150 of recent places associated with the user is displayed. This is similar to a web browser history of recent pages that a user has visited. The user can be recognized by logging into the system with a username and password. Or the user can be recognized by the system in other ways such as by using information stored on a device (e.g., a "cookie"), by using biometrics, etc. The thumbnails for Recent Places are shown in a grid having 2 rows and 4 columns. In general, different grid arrangements and sizes of thumbnails can vary. Also, different thumbnail arrangements from the grid view may be used.

In a particular embodiment, not only are web pages the subject of Recent Places thumbnails, but application pages, panels or other display portions of an application can also be shown. Depending on how the MeeBar is configured, the sensitivity or types of locations can be set or filtered. For example, a particular view in a user's email can be represented. Or a directory or subdirectory can be shown as a thumbnail. Other types of locations can be used as the subject of thumbnail views associated with the Recent Places icon button, or with other icon buttons. The thumbnails provide a visual cue or recognition for the user. When the user selects a thumbnail (e.g., by clicking or touching the thumbnail) then the user's view is switched to the selected location.

Figure 4:
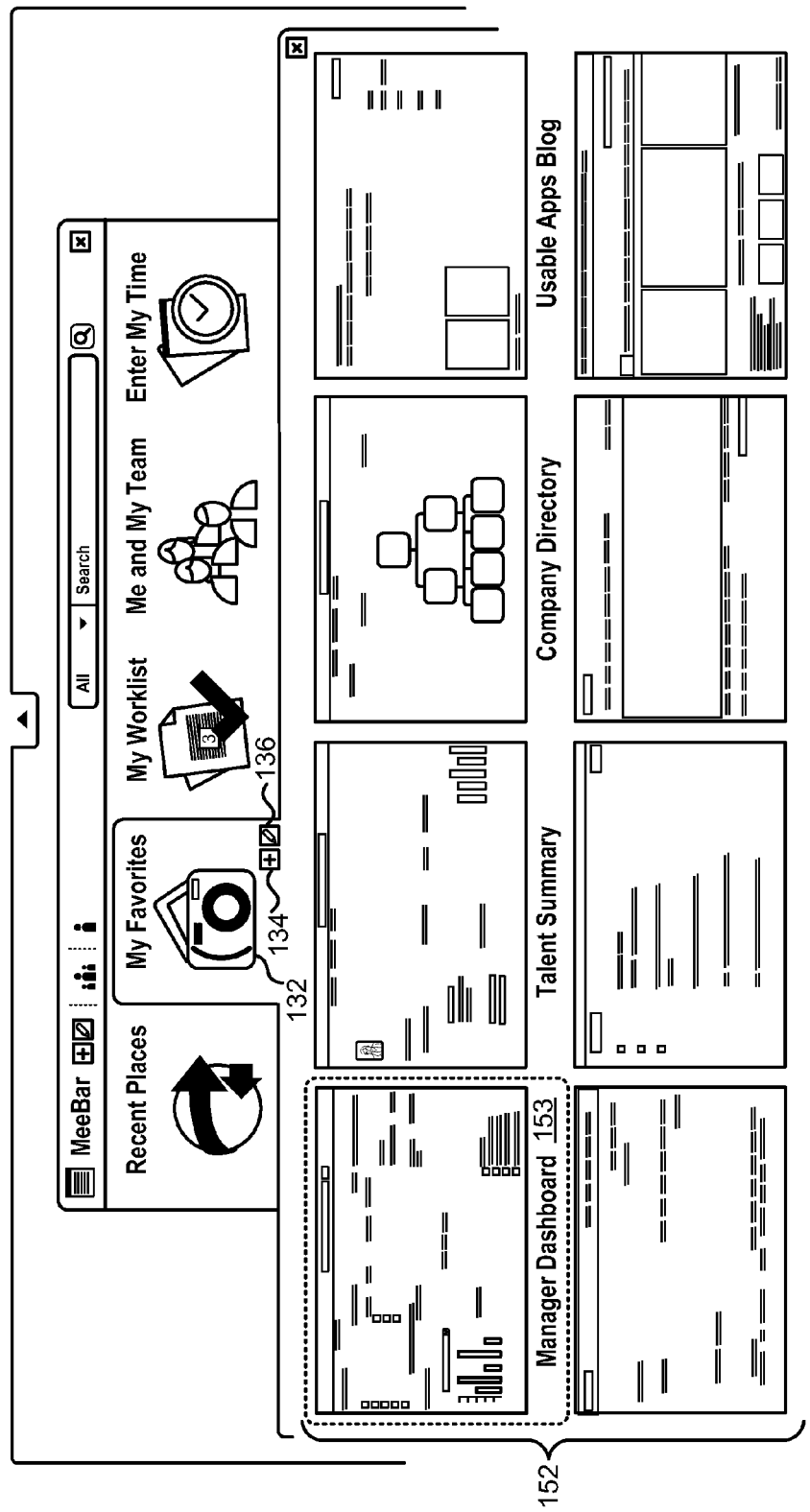
FIG. 4 is a fourth illustration of a navigation bar.

FIG. 4 shows the display after a user has selected "My Favorites" button 132. A grid of thumbnail views is again shown at 152. These thumbnails correspond to locations that the user has selected, rather than strictly locations that the user has recently visited. In a particular embodiment, a user can add thumbnails by clicking on add button 134. This allows a user to open a desired location and activate a predetermined control (e.g., a combination of keystrokes, a dedicated button that is shown on the screen to capture the location, etc.) in order to add the selected view of the location to the thumbnail views under the "My Favorites" category. For example, the current page or location that is displayed under the MeeBar can be added as a favorite by selecting a control. Clicking on a thumbnail launches the associated application program page or other source of the thumbnail so that the user is placed into the application at the location represented by the thumbnail. For example, if a user activates thumbnail 153 of FIG. 4, labeled "Manager Dashboard," then a window is displayed and focus is given to the window to show the Manager Dashboard running as the user last left it as shown in FIG. 8.

The user can edit the existing thumbnails by clicking on thumbnail edit button 136. After clicking the thumbnail edit button, the user can highlight and delete thumbnails, drag to move thumbnails; change color, style, size or other properties of thumbnails; or make other changes to the existing thumbnails. Any suitable manner of allowing the thumbnails to be added or edited can be employed.

Figure 5:
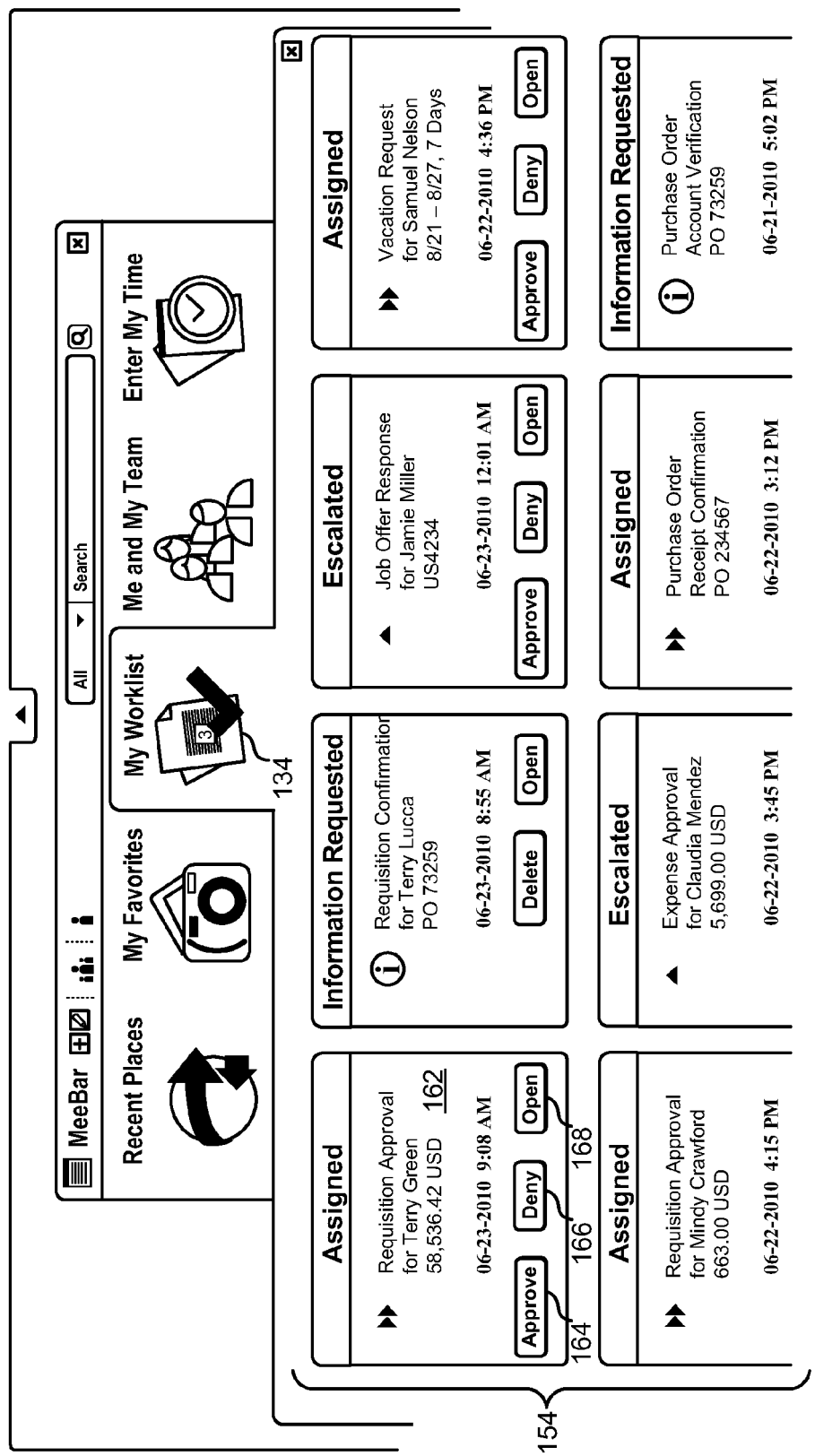
FIG. 5 is a fifth illustration of a navigation bar.

FIG. 5 shows thumbnail view 154 corresponding with icon button "My Worklist" 134. The various thumbnail views in this case are action items generated by a workflow application or other workplace management application. In this view, the thumbnails are active control panels that provide the same functionality as if the user were at the location (e.g., page, panel, display, or portion thereof) in the application, itself. For example, by clicking directly on buttons 164, 166 or 168 within thumbnail 162, the user can perform actions to, respectively, Approve, Deny or Open the "Requisition Approval for Terry Green" as is known in the art. This approach of providing active thumbnails can be used with any control or other action provided by the location to which the thumbnail corresponds.

Figure 6:
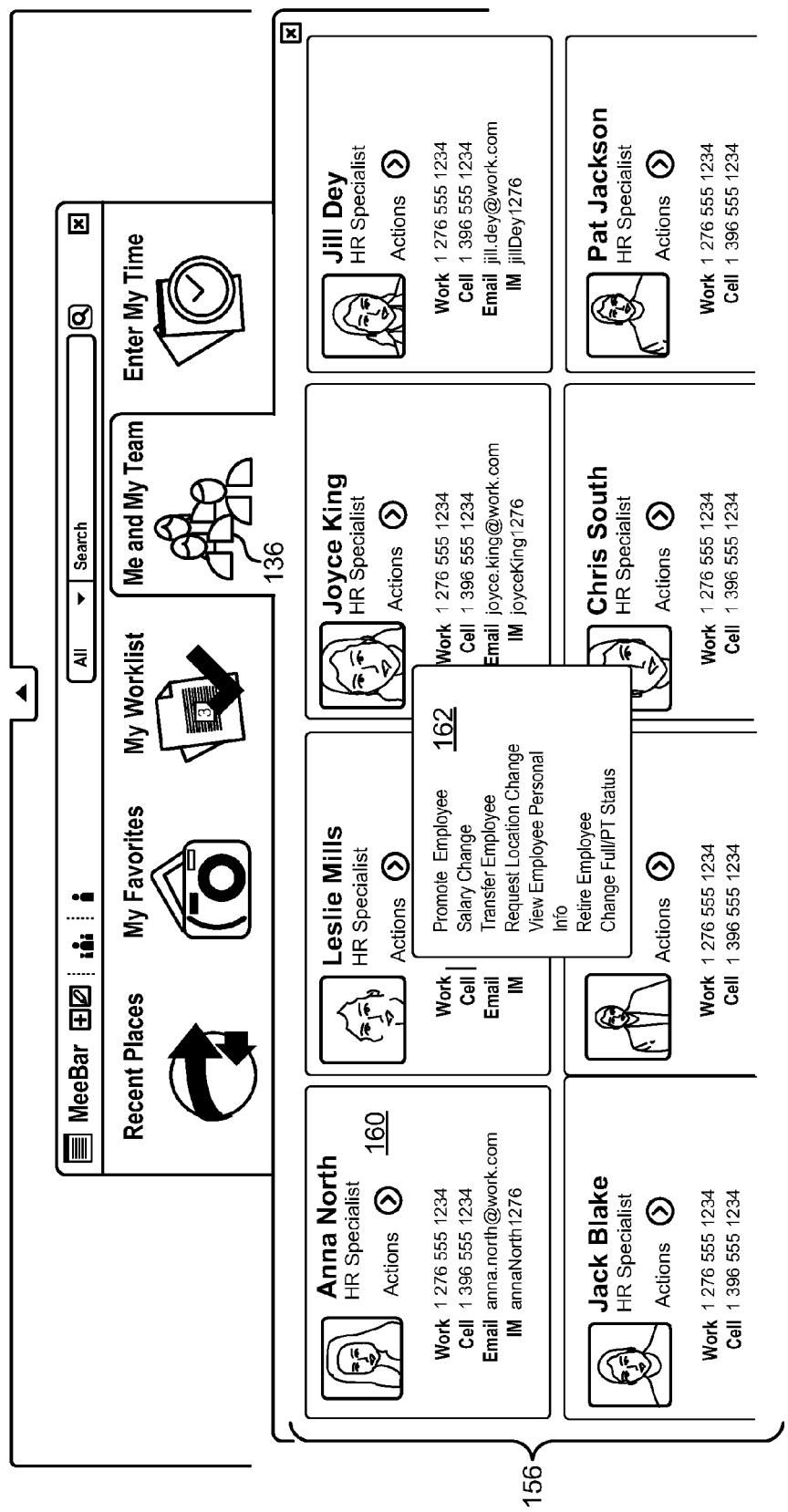
FIG. 6 is a sixth illustration of a navigation bar.

FIG. 6 shows thumbnail view 156 after icon button "Me and My Team" 136 has been activated. In FIG. 6, menu 162 appears after the user selects thumbnail 160. This shows that in addition to allowing the controls within the thumbnails to be active, additional controls, selections and/or other actions can be provided such as menu pop-ups upon focusing on or selecting a thumbnail.

Figure 7:
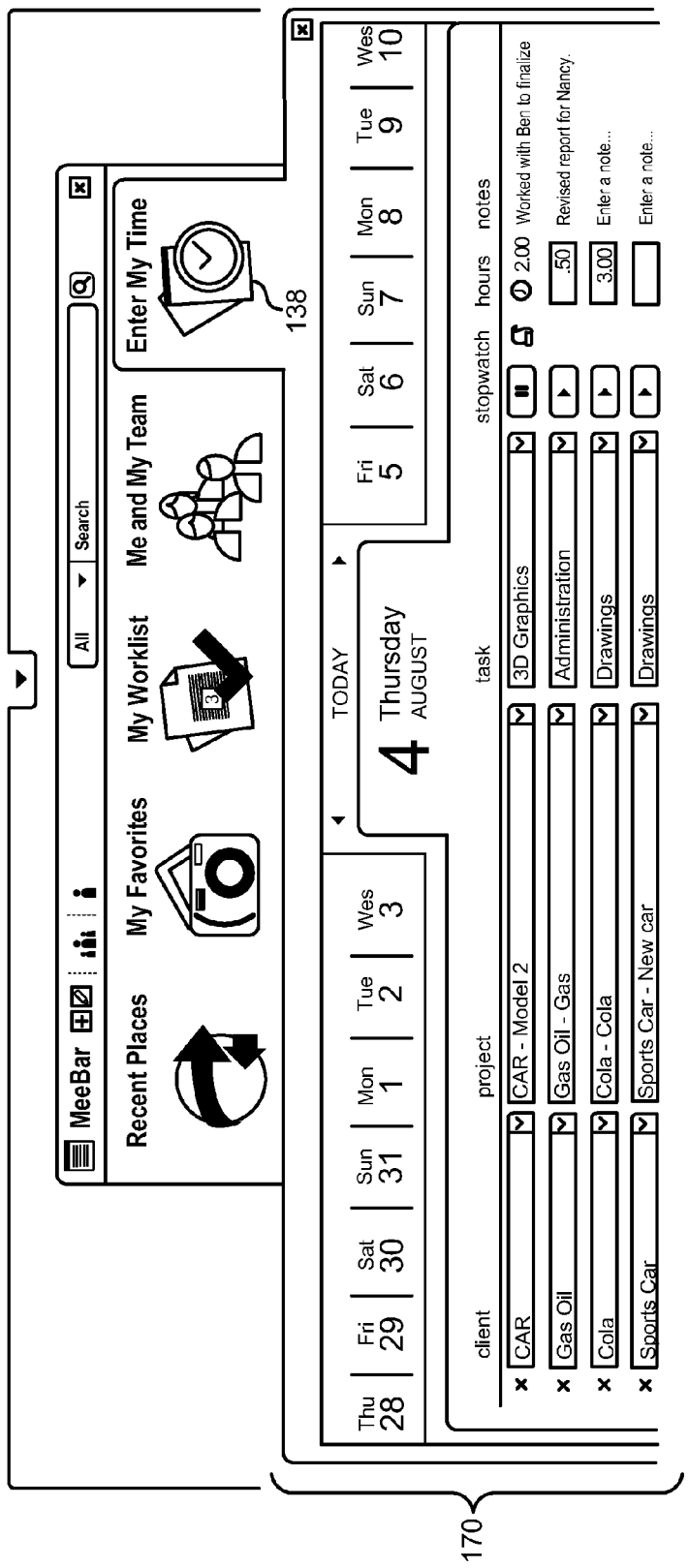
FIG. 7 is a seventh illustration of a navigation bar.

FIG. 7 shows the grid view area 170 being used to display a single location or page of an application in response to the user selecting icon button "Enter My Time" 138. In FIG. 7, the "Enter My Time" selection opens a full interface as if the associated timekeeping application program were running in the entire grid display area as a dedicated window to the timekeeping application. In other embodiments, all or a portion of a display of an application program or other location can be allowed to run in a greater portion of the grid view area than just a single thumbnail. For example, an application program or website page or location can use two or more thumbnail-sized areas. The location can be displayed alongside of, or adjacent to, other locations or thumbnails.

Figure 9:
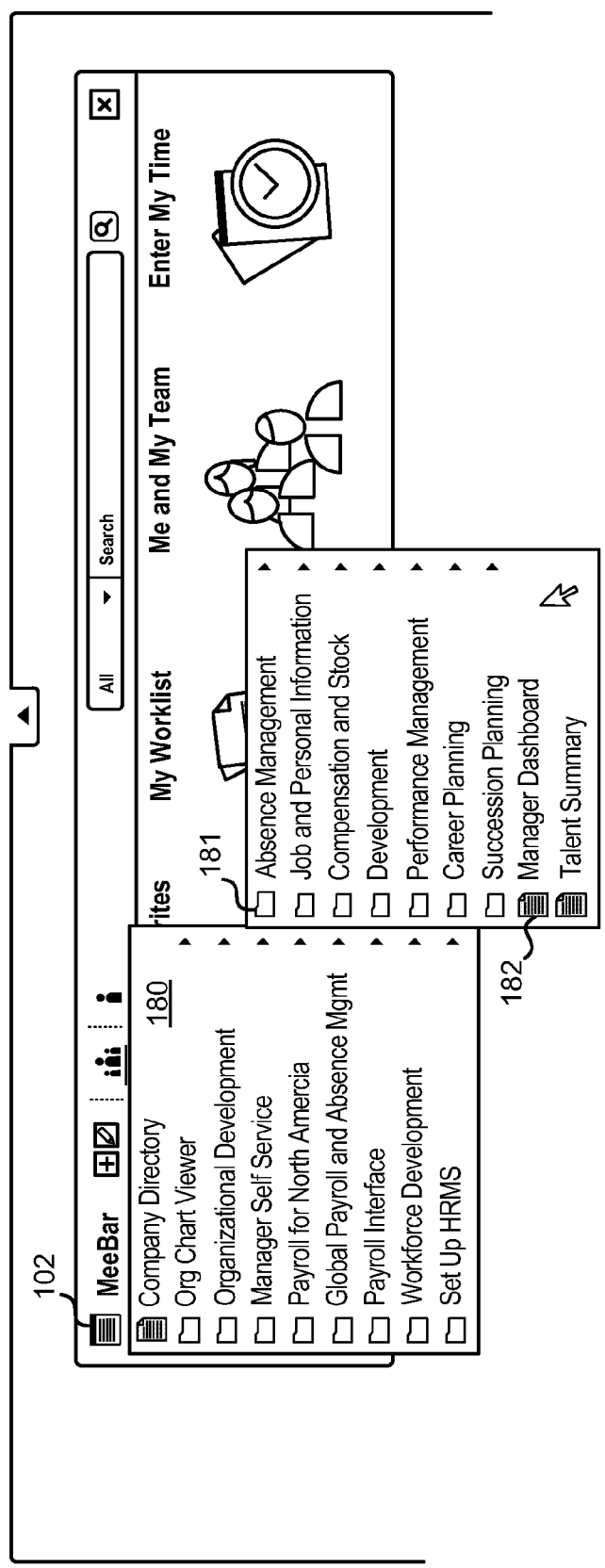
FIG. 9 is an eighth illustration of a navigation bar.

FIG. 9 shows the effect of activating menu button 102. As a result, the user is presented with the top-level folder directory structure 180 of the user's workspace, similar to a standard desktop operating system. The user can navigate through the directory structure by expanding the folders to reveal the folder's contents such as sub-folder 181. Items within the various folders can be selected by e.g., clicking on the item such as document 182.

Figure 10:
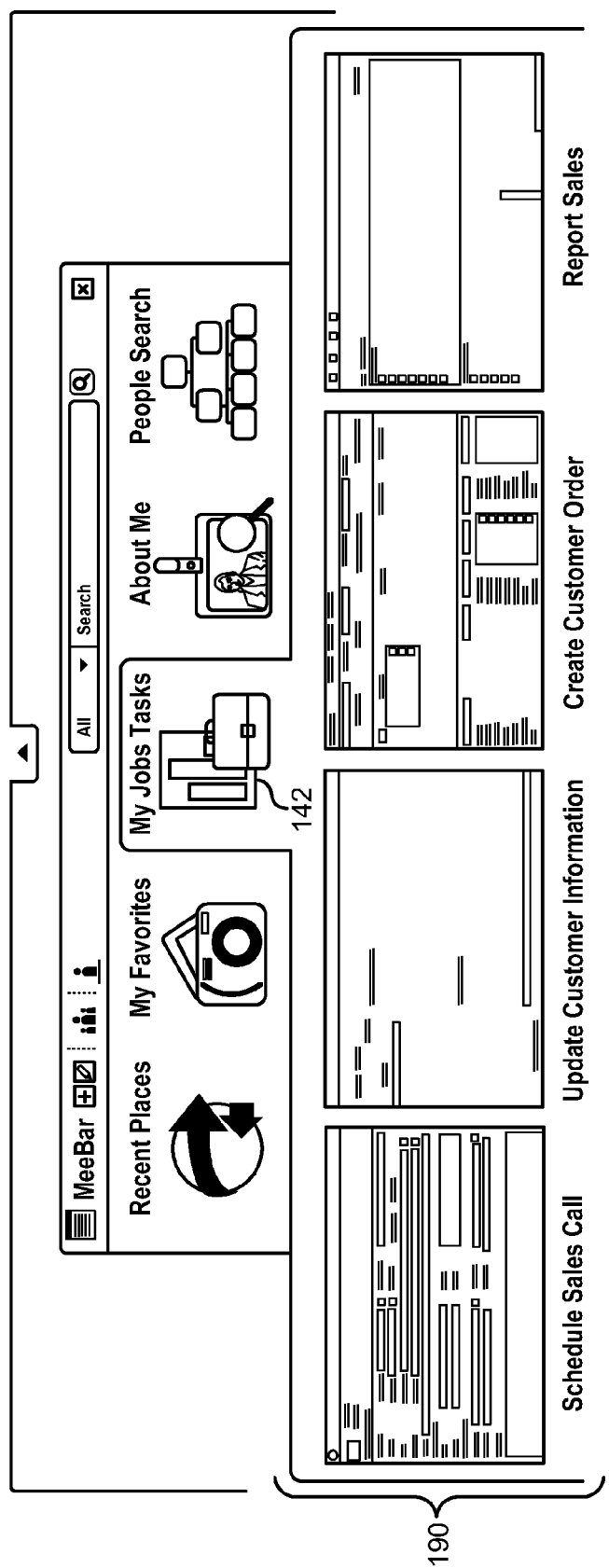
FIG. 10 is a ninth illustration of a navigation bar.
Figure 11:
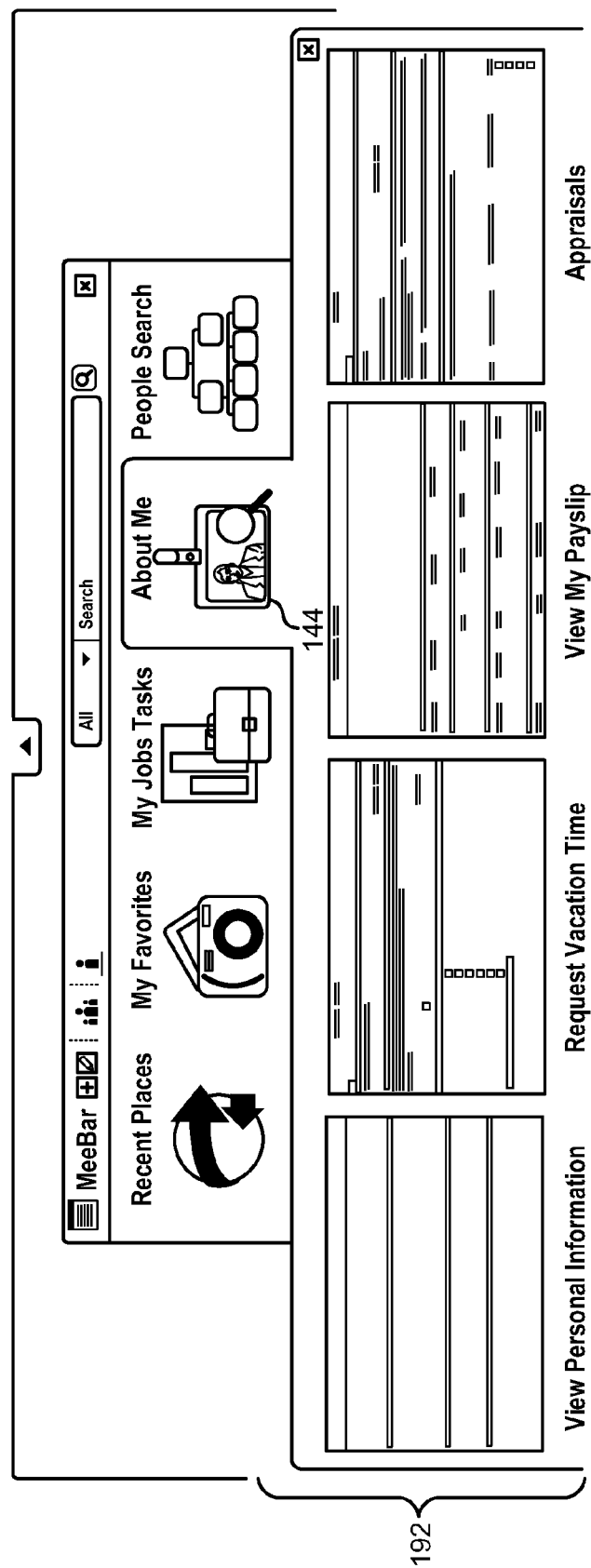
FIG. 11 is a tenth illustration of a navigation bar.
Figure 12:
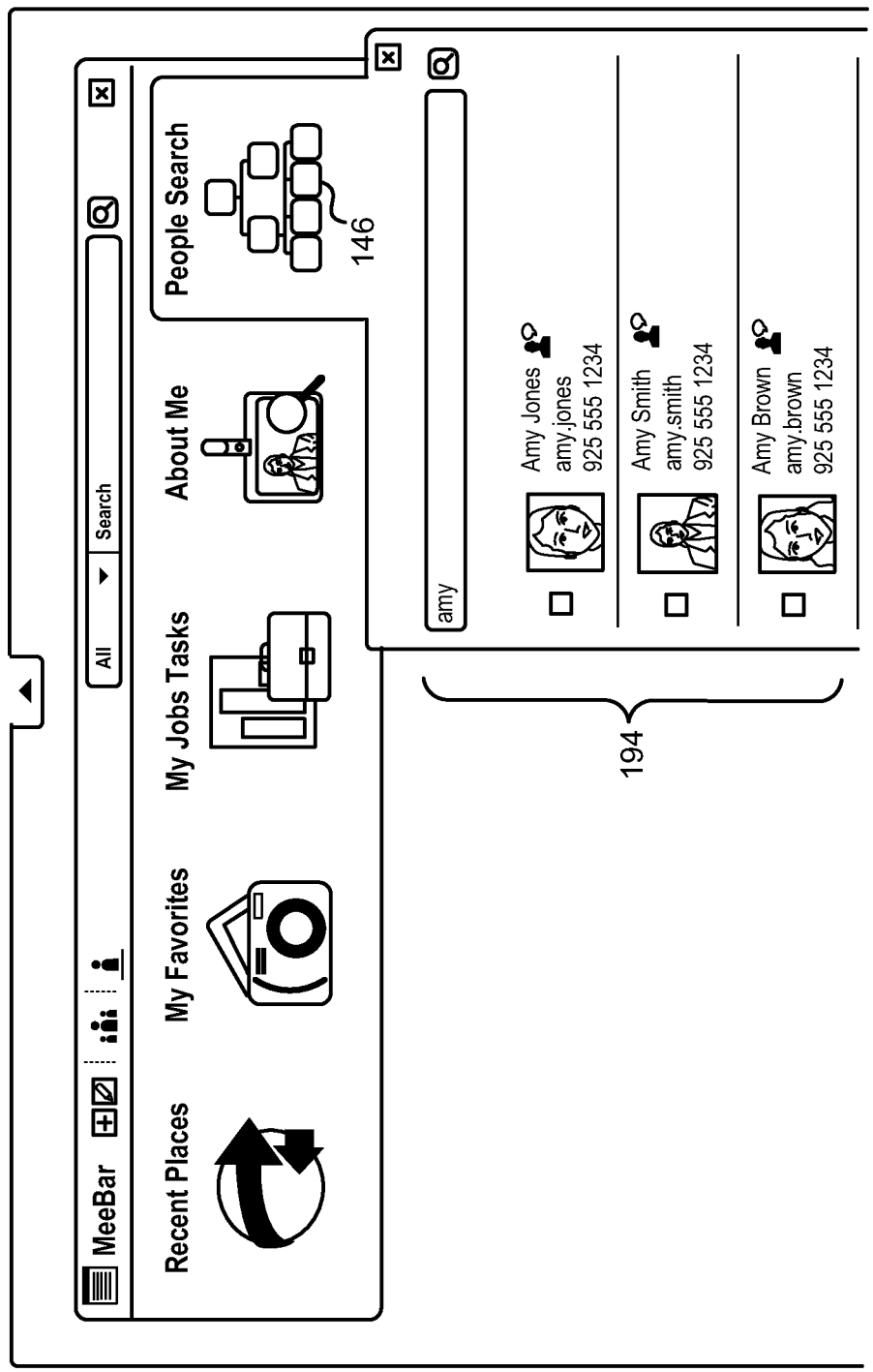
FIG. 12 is an eleventh illustration of a navigation bar.

FIGS. 10-12 illustrate activation of icon buttons 142, 144 and 146 in the MeeBar of FIG. 2.

In FIG. 10, selecting "My Job Tasks" 142 shows thumbnails in grid view area 190 that correspond with tasks that the user must frequently perform. Naturally, these tasks can vary with different employee positions and responsibilities. Similar to the previous discussion, selecting a thumbnail takes the user to the location represented by, and associated with, the selected thumbnail.

FIG. 11 shows the effect of selecting "About me" 144 and the various thumbnails that are presented in grid view area 192.

FIG. 12 shows that selecting "People Search" 146 presents the user with a typical workplace personnel search tool in grid view area 194.

Referring to FIG. 1, add icon button 106 and icon edit button 108 allow a user to respectively add and edit icon buttons. In a particular embodiment, selecting add icon button 106 displays a library of icon buttons and/or features that the user could choose to add to their MeeBar. So if a user did not want a My Team icon button, the user could choose another button to add in its place, allowing the user to tailor the MeeBar to fit their needs.

It should be apparent that although specific arrangements of control buttons, icon buttons and thumbnails are shown that various features may be equally usable in other arrangements. For example, the icon buttons may be arranged on the top or bottom, or vertically along the left or right sides of the thumbnails. Other arrangements are possible such as icon and/or control buttons intersecting or crossing the thumbnail view, overlapping the thumbnail view, using multiple MeeBars, etc.

In other embodiments, different formats for the thumbnail layouts or views may be used such as a list, overlapping sets, a carousel, etc. In a particular embodiment, the MeeBar acts like a floating toolbar that can be toggled on or off with a single click. The MeeBar can present a role-dependent view of recent, favorite, worklist, team-based, or other personalized pages. The bar provides a simple, uniform way to rapidly navigate to desired pages for both enterprise and consumer content. It is adaptable to both desktop and tablet platforms. Users can complete transactions directly from pages exposed by the bar, or they can click on pages to further drill down in-context. Thumbnail objects include tiles that can be exposed in a grid or in a hierarchy.

Although a particular style has been illustrated for the MeeBar, it should be apparent that other styles can be used. In a particular embodiment, a style approach is used to try to make objects larger, more colorful, and fun for users.

Enterprise Global Dynamic Menu Framework (GDMF)

An Enterprise Global Dynamic Menu Framework (GDMF) includes a framework for a menu that can expose dynamic data including navigation elements, interactive data, application objects and other objects from diverse sources in one unified location. A "location" can include, for example, a page, panel, or other portion of a display generated by an application program such as a word processing program, spreadsheet, workflow management, browser, etc. The locations can be obtained from products from a particular software manufacturer, 3rd party vendors, or from other sources. Different locations can have different styles, or look and feel, represented in different manners but still share underlying structure and data in a dynamic nature.

In one embodiment, a global menu framework for enterprise software is provided that can include menu elements across all software offerings from the product line/suite all the way down to the function/feature level. With this framework, an enterprise software vendor can manage and create many specific, secure, multi-platform or platform specific menu instances for different user types/roles. Each menu entry in the menu can load and run independently. This prevents slowing down of other menu entries if, for example, one rich-content menu entry takes a long time to load or there is a bug. This also prevents one menu entry from bringing down the whole menu system. Using this framework, a user can access all of an enterprise software vendor's products in one place that the user has access to, as well as have quick access to key data points and tasks.

Figure 13:
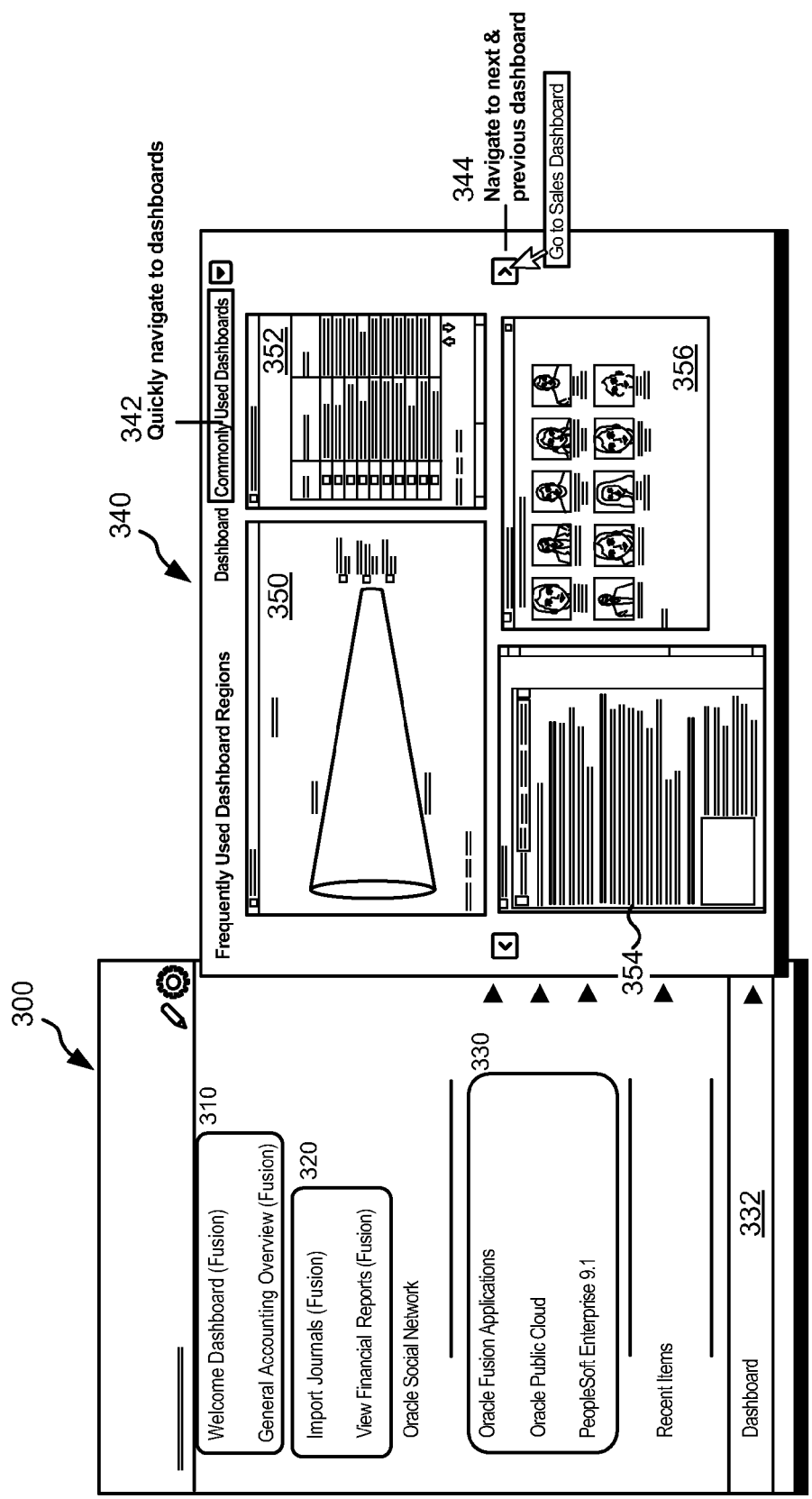
FIG. 13 illustrates an example of objects in home menu

FIG. 13 illustrates an example of objects in home menu 300 such as navigation anchors 310, actions 320, menu items 330, or other objects. The boxes around the objects at 310, 320 and 330 are for illustration purposes but may be used in other embodiments. The menu can potentially access all menu items across all available enterprise software products, down to the function/feature level. This can allow the user to view key data updates without navigating to the underlying application. A product team and/or consultant/vendor can predetermine sets of objects for specific user roles, and users may further personalize these selections. In an embodiment, objects within a framework can each load and run independently, and can automatically inherit updates to the underlying content. If one object crashes, the rest of the menu can keep working. The objects can be dynamically updated by their underlying applications. The targets of the objects can point to specific actions or navigation points such as page regions, contextual areas, fields, or other objects or actions.

In one embodiment, home menu 300 can serve as the root node or starting point. Menu entries can support a variety of content, such as pop-ups or other static and/or dynamic content. Security is maintained via login, inactivity logout, and re-login support. Certain menus may require additional logins as well. Both web and standalone target applications are supported by the menu framework, across platforms such as laptops, desktops, tablets, TVs, and other mobile devices. The menu can be accessed in any desired fashion such as being provided as a default upon power-up, via a menu, soft or hard keys, etc.

In general, a GDMF menu instance can support a variety of devices. Certain ones can be made to support certain devices with specific UIs for that device to ensure an optimal user experience. So while different GDMF instances may show the same data, they can show it in different views to be optimized for that device.

FIG. 13 shows composite dashboard 340 in a dedicated window after a user has selected dashboard selection 332 from home menu 300. Composite dashboard 340 includes regions from other dashboards that are used most frequently. In this example, the other dashboard regions include 350, a Sales Pipeline infographic from a CRM dashboard; 352, a Customers at a Glance table from a CRM dashboard; 354, a Current News from a general Home Dashboard; and 356, a People Connection (intranet phone book) from a general Home Dashboard supplied by HCM (HR division). Navigation control 342 allows different categories of composite dashboards, or particular dashboards, to be displayed. Next/Previous navigation control 344 allows dashboards to be displayed in a predefined order, or in the current order of viewing for the current session.

Figure 14:
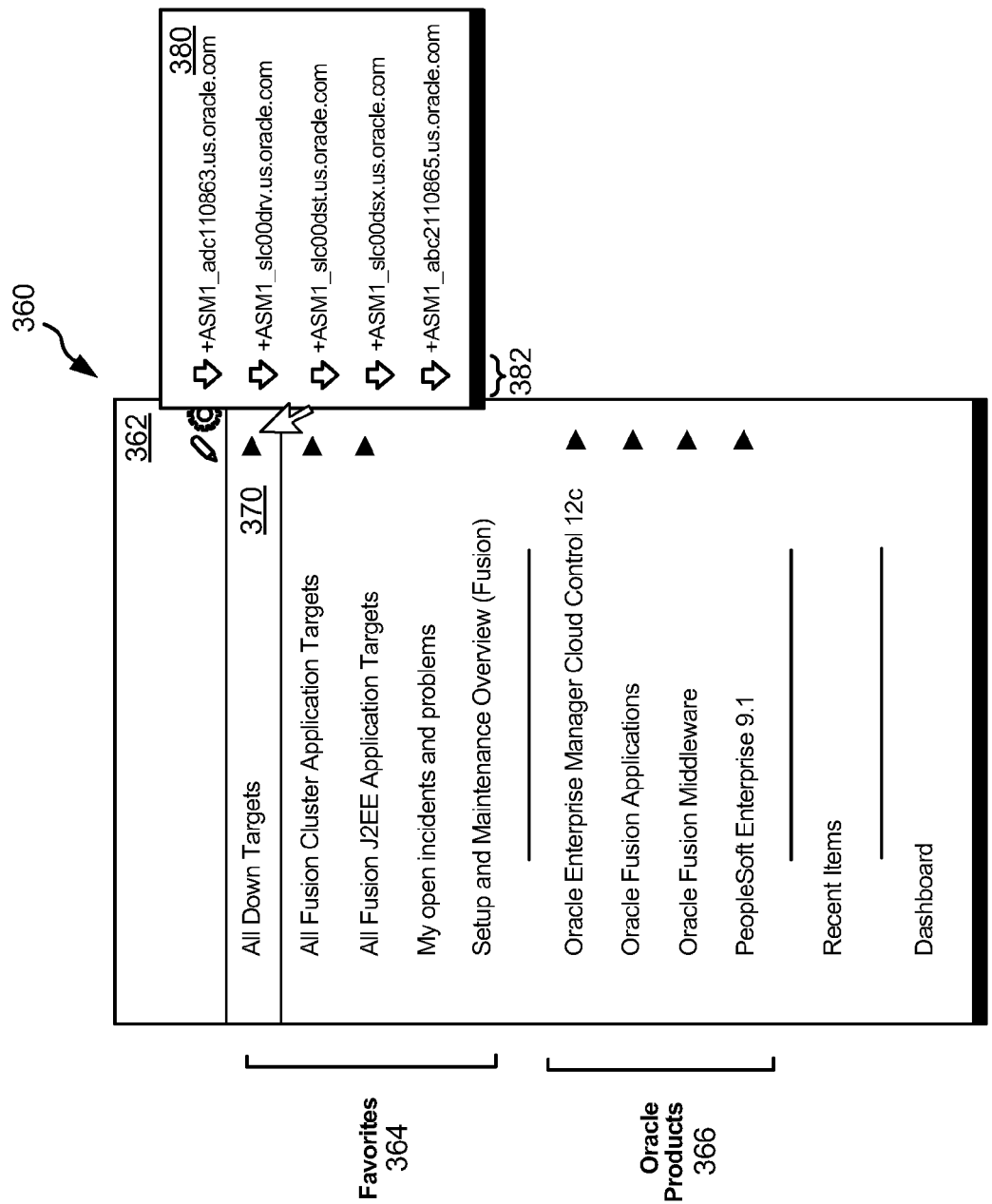
FIG. 14 shows interface 360 for accessing a framework

FIG. 14 shows interface 360 for accessing a framework that allows a Database Administrator (DBA) to monitor live, dynamically updating database statuses through menus that can directly access Enterprise Manager flows. Although this example is for a DBA, it should be apparent that other interfaces can be designed for different types of users. For example, a sales representative can have a view that is tailored to Sales Representative flows and shows dynamic information in a manner that would be relevant to a Sales Representative.

Enterprise Manager or Sales Representative flows, or other types of business or application flows and their respective data sources seeded to the GDMF, include the state within an application program ("app") as shown by the user interface for a particular user at a particular point in the operation. For example, a flow includes a representation of information as displayed on the user's screen along with any control options that may provided to a user at that particular state or location within the application. Similarly, data sources can be locations with representations or states. For example, an Enterprise Manager can be an application that seeds database information. The data can be provided to the menu as a particular location without exposing anything else about the Enterprise Manager application.

In the DBA framework shown in FIG. 14, menu 362 includes categories grouped as "Favorites" at 364 and "Oracle Products" at 366. Naturally, any other categories can be defined. A menu selection "All Down Targets" 370 is used to bring up panel 380 which includes database names that are currently down. The statuses of the databases are shown by red arrows 382 to the left of the panel. These red arrows can change to other shapes, icons or symbols to indicate other characteristics or properties. In a different embodiment, numbers can be used such as adjacent to menu selection 370 to indicate, e.g., the number of databases that are down, or the number of entries that will be shown in the panel if the menu selection is selected.

In a particular embodiment, clicking on a database name or adjacent symbol in panel 380 brings up a display of the corresponding database's control panel so that the DBA can take additional action. The database control panel can be implemented as a web page. Or, alternatively, an application can be launched or accessed to present a control panel to take action or to edit the corresponding database. In general, any type of functionality may be invoked including $3^{rd}$ party applications from disparate manufacturers.

Figure 15:
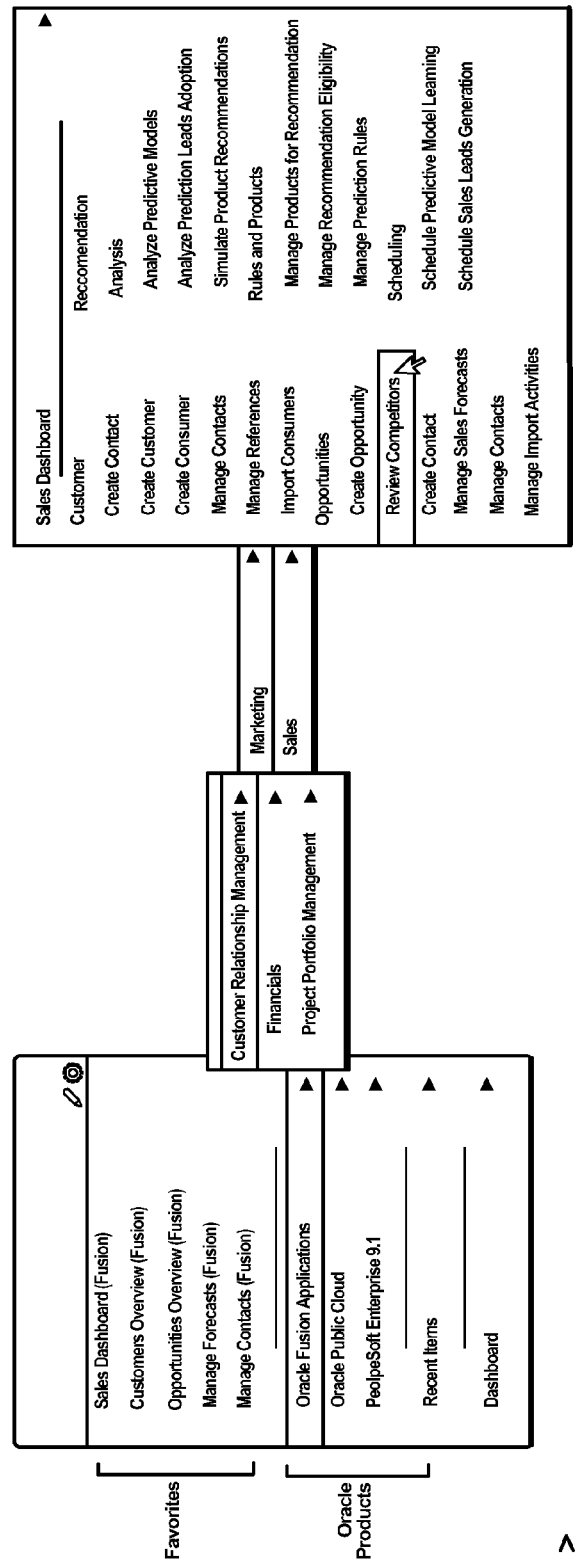
FIG. 15 shows an example of an interface for a manager framework.

A framework can also be tailored to a CRM manager who needs to monitor, navigate, and act upon key dashboard data without having apps loaded in browser windows. An example of an interface for a CRM manager framework is shown in FIG. 15. Other applications are possible. FIG. 15 shows the menu for key sales functions for the user as defined by a team responsible for the Data Sources and the GDMF Menu Instance. The look and feel/UI design of this Menu Instance serves to present the data sources in this manner, but a different menu instance could present the same data in a different manner, even with the same underlying Data Sources. The team behind the data sources decided that certain tasks like Create Opportunity should be exposed and available. The GMDF Menu Instance implementer can then decide to take all or specific parts of this data source for their specific menu instance.

Each application that is written to a framework can independently push (via Application Programming Interfaces (APIs), for example) customizable menus to a separate instance, which serves as a higher-level organizational framework. Different instances of the GDMF can be made via the API to have a desired look and feel, or to support unique or similar devices, while still sharing the same repository of data sources 730. By maintaining a separate instance for the menu framework and menu items, specific applications or menu items that are unavailable or down need not impact the performance or selection of other items in the menu tree. In various embodiments, customers can modify the menu instances via an admin account, or such modifications can be made via the API. Customers can even choose and setup different menu versions of different GDMF Menu Instances for different user roles and/or platforms.

The GDMF can provide a centralized, uniform, and/or simplified entry point to installed enterprise applications. It can provide a desired, or optimal, user experience across different platforms, enabling the user to rapidly complete tasks using a simplified user interface that is optimized to that device, user, and user professional and computing skill set. Various applications can co-exist with a uniform entry experience. In many cases, key data updates can be available without navigating to specific applications. Unlike browser bookmarks, links can also be dynamically updated, thus improving or ensuring data integrity.

Figure 16:
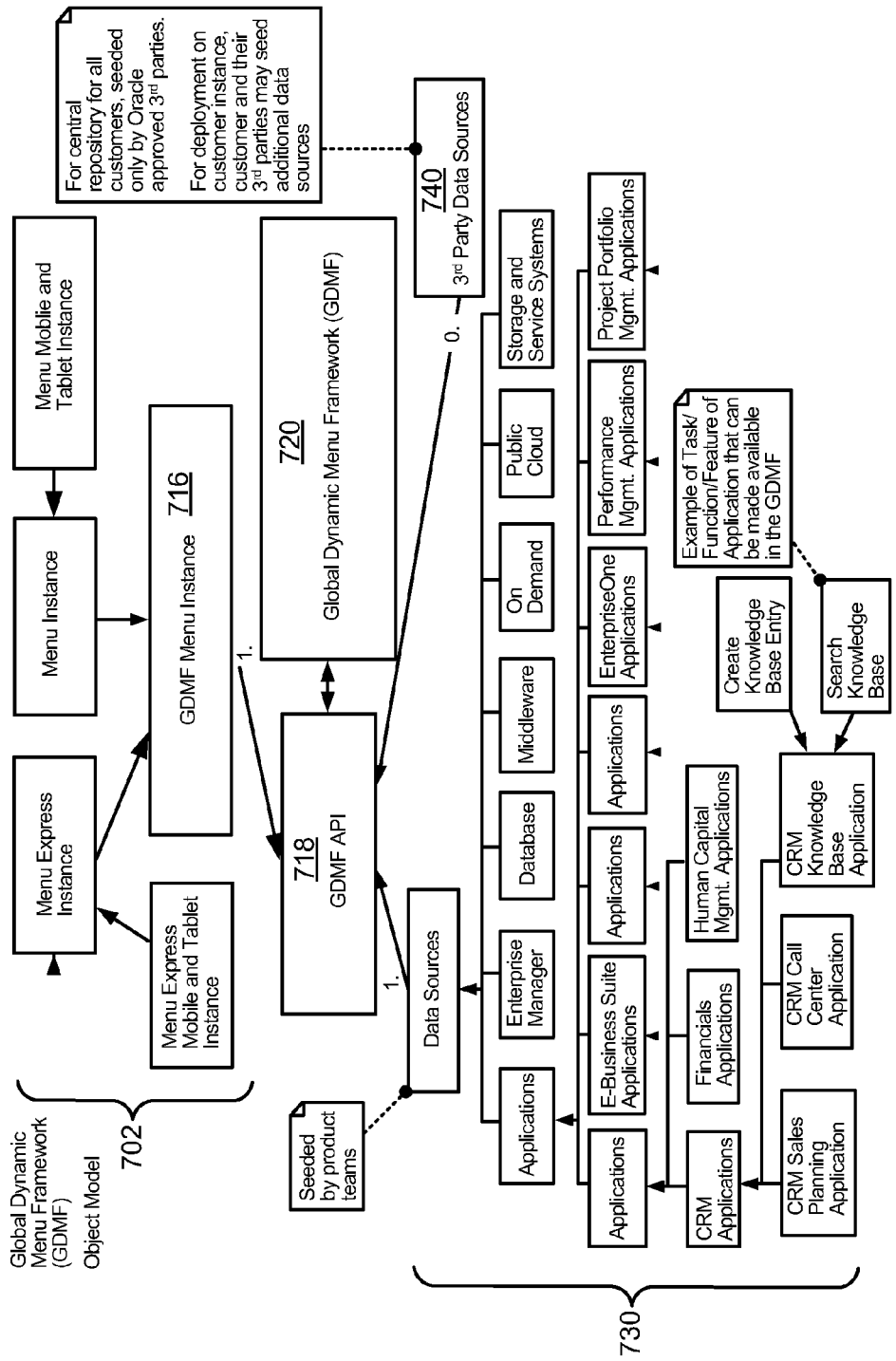
FIG. 16 shows an object model providing a generalized high-level description of a software architecture to implement selected functionality of a GDMF.

FIG. 16 shows an object model providing a generalized high-level description of a software architecture to implement selected functionality of a GDMF. FIG. 16 is but one example of an architecture. Other implementations and embodiments may use different or modified objects. Objects may be omitted from, or added to, those shown in FIG. 16 while still achieving a useful architecture.

In FIG. 16, Global Dynamic Menu Framework (GDMF object) 720 is the primary object that contains the primary core codebase for the GDMF. In one embodiment the GDMF object includes the core code that controls the way the framework works. The GDMF object also includes core shared code among the GDMF Menu Instances at 702, ranging from all elements of its operations including a model, view and controller core code including core code functionality of the GDMF API, Data Sources, and 3rd Party Data Sources shown at 730.

GDMF Menu Instances objects 702 inherit functionality from the GDMF. In one instantiation, shown in FIG. 16, for security purposes they can do this programmatically via the API in order to preserve the integrity and security of the GDMF. When updates to the GDMF core code base need to be made, they can be done to objects 702 and the children objects mentioned above will inherit those enhancements and be updated in the process, as discussed below regarding FIG. 17. GDMF API object 718 is an application program interface to communicate directly and securely with the GDMF object. Data Sources, 3rd Party Data Sources, and GDMF Menu Instances all leverage the API to communicate with the GDMF and with each other. The implementing organization can control the visibility of the API internally, for 3rd parties, and for the public.

The Data Sources at 730 are the primary data sources provided by the implementing organization for use with the GDMF via the GDMF API. They are typically UI agnostic. Data that will be used in menu entries (part of GDMF Instances) ranging from a product line to a task are captured in this object. At the lowest level, tasks may be captured as a Data Source. This object will contain any references to and/or actual relevant data as allowed by the API (Dynamic Application Connection, Application Task Connection, Dynamic Image, etc.) that can then be used by any GDMF Menu Instance for rendering and interaction by the end user. Higher level data sources like Oracle Fusion Applications can contain mostly references to children/sub Data Sources, but may contain their own unique data or data references as well.

Third Party Data Sources 740 are similar to Data Sources except that they are not created/owned/maintained by the implementing organization/company/vendor but rather by 3rd party organizations. The implementing organization/company/vendor may allow 3rd parties to seed content to the GDMF via the GDMF API. It is up to the implementing organization if the API will be open to any, some, or specific 3rd parties. This security layer could be achieved with developer keys. These 3rd party data sources would most likely be hosted on their own servers but could be packaged with the GDMF base installation or provided by the vendor as an add on.

GDMF Menu Instances 716 is a specific instantiation of the GDMF that can be interacted with by the user, usually in rich visual manner. Numerous of such instances would be expected for different devices, screens, and users. A GDMF instance will contain references to specific primary (vendor implemented) and 3rd Party Data Sources and will render the respective data (sometimes all or selectively) in a manner that is appropriate and in line with the menu instance. For example, The Menu Instance many render Create Knowledge Base Entry Data Source in one visual manner but the Menu Express Mobile and Tablet Instance may render it in another visual manner and may also choose not to include all aspects of the data source because of spacing/screen real estate and user function needs.

Figure 17:
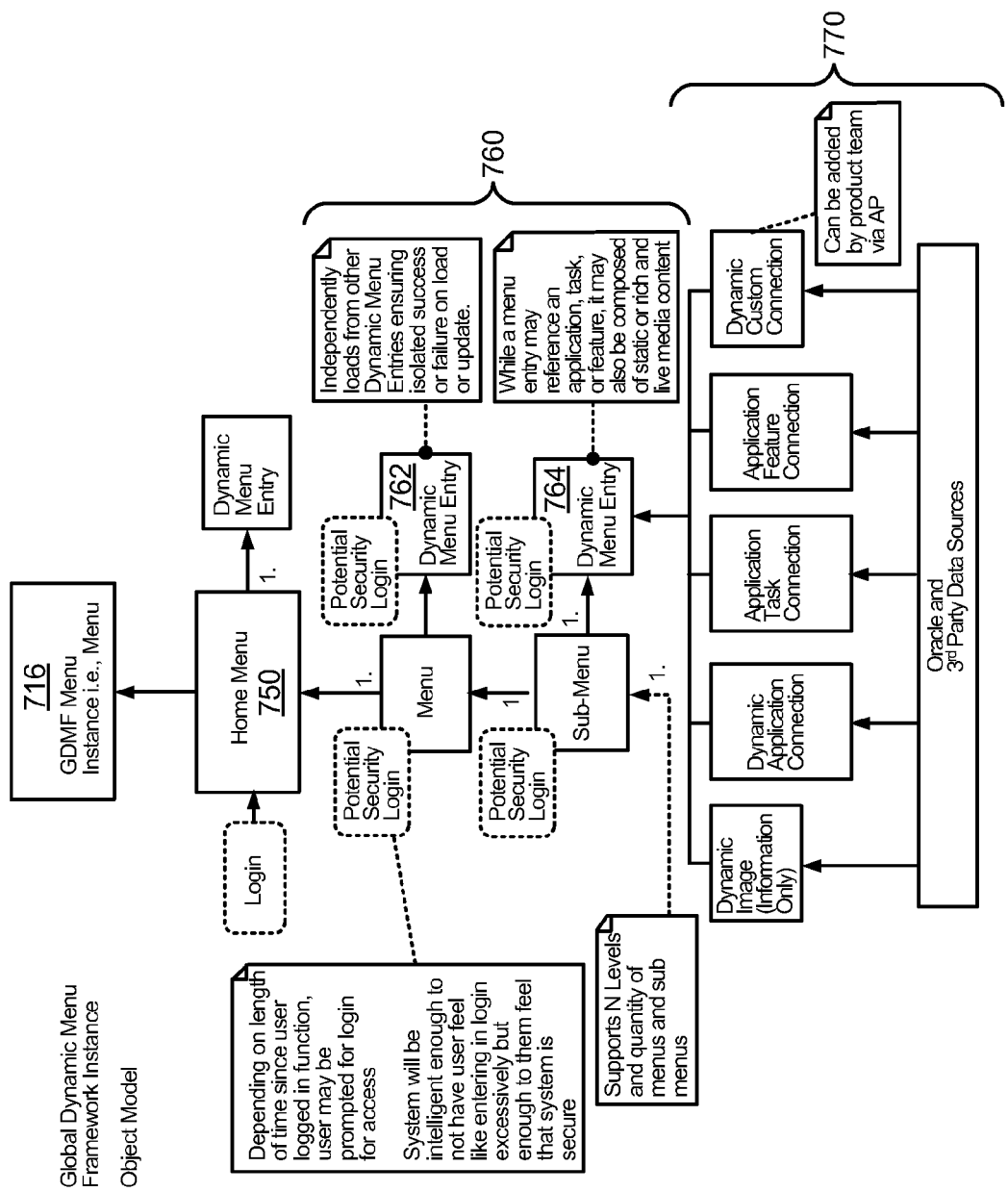
FIG. 17 shows details of menu instance of FIG. 16.

FIG. 17 shows details of menu instance 716 of FIG. 16. FIG. 17 illustrates but one example of a menu instance design. Different GDMF Menu instances will have different UI/look and feel and may or may not support similar or different devices, they can all share the same underlying framework in order to ensure security when communicating with the API.

Home Menu 750 is typically the top-level menu. Examples of a home menu include those shown in FIGS. 13 and 14, above. The Menu Instance can have 1 or more Menu objects. A user may be required to login before being allowed to access a home menu. Depending on a length of time since the user logged in and/or sensitivity of function, a user may be prompted to login for access. The home menu can contain any number of menus and sub-menus shown at 760.

Menus such as Home Menu, Menu, or Sub Menus can contain one or more Dynamic Menu Entry objects such as 762 and 764. It is at the Dynamic Menu Entry objects that different types of data can be visually displayed in the menu to be viewed and/or interacted with. A Menu Instance's 716 definition includes information about how each of these different types of information should be displayed, such as Dynamic Application Connection, Application Task Connection, Dynamic Image, etc. shown at 770. Content from a Data Source will appear in the Menu Instance in a certain visual manner based on how content for that Dynamic Menu Entry content type has been determined to be displayed for that menu instance. Custom entries can be made as well.

For example, in FIG. 14, the down database instance menu 380 could be a custom creation by the product team to achieve such a result. At the same time, the sub menus shown in FIG. 15 could just use standard Dynamic Menu Entry look and feel for that standard content type. For example Create Opportunity can use the standard Application Feature Connection so it will use whatever UI style for that type of Dynamic Menu Entry as defined by that Menu Instance.

In a particular embodiment, when accessing specific Menus and Sub Menus, a security login may or may not be required as determined by a set of rules first governed by the GDMF, then the Menu Instance, and then the Data Source, in that order of decision. GDMF in this case has final say so to speak about security login necessity. This is done to ensure a uniform user experience regardless of menu instance or data source.

Simplified User Interface

FIGS. 18-23 illustrate an embodiment for a user interface. In particular embodiments, the interface features of FIGS. 18-23 may be adapted for use with any Oracle Applications line of products including Oracle®'s Fusion® line of products. This serves as an initial welcome experience layer to end users and can surface key user tasks and functions. This layer can co-exist and work on top of any existing application and can serve as an integrated simplified environment for end users to accomplish their key objectives. For example, this user interface can serve as the introductory layer to any primary application from any vendor e.g. Peoplesoft/Siebel/Oracle Fusion etc. This layer also provides a gateway to navigate back and forth and pass context between the simplified layer and the primary application. Although particular embodiments may be discussed in relation to a specific application or product, any suitable application or product may be used with one or more features described herein.

Figure 18:
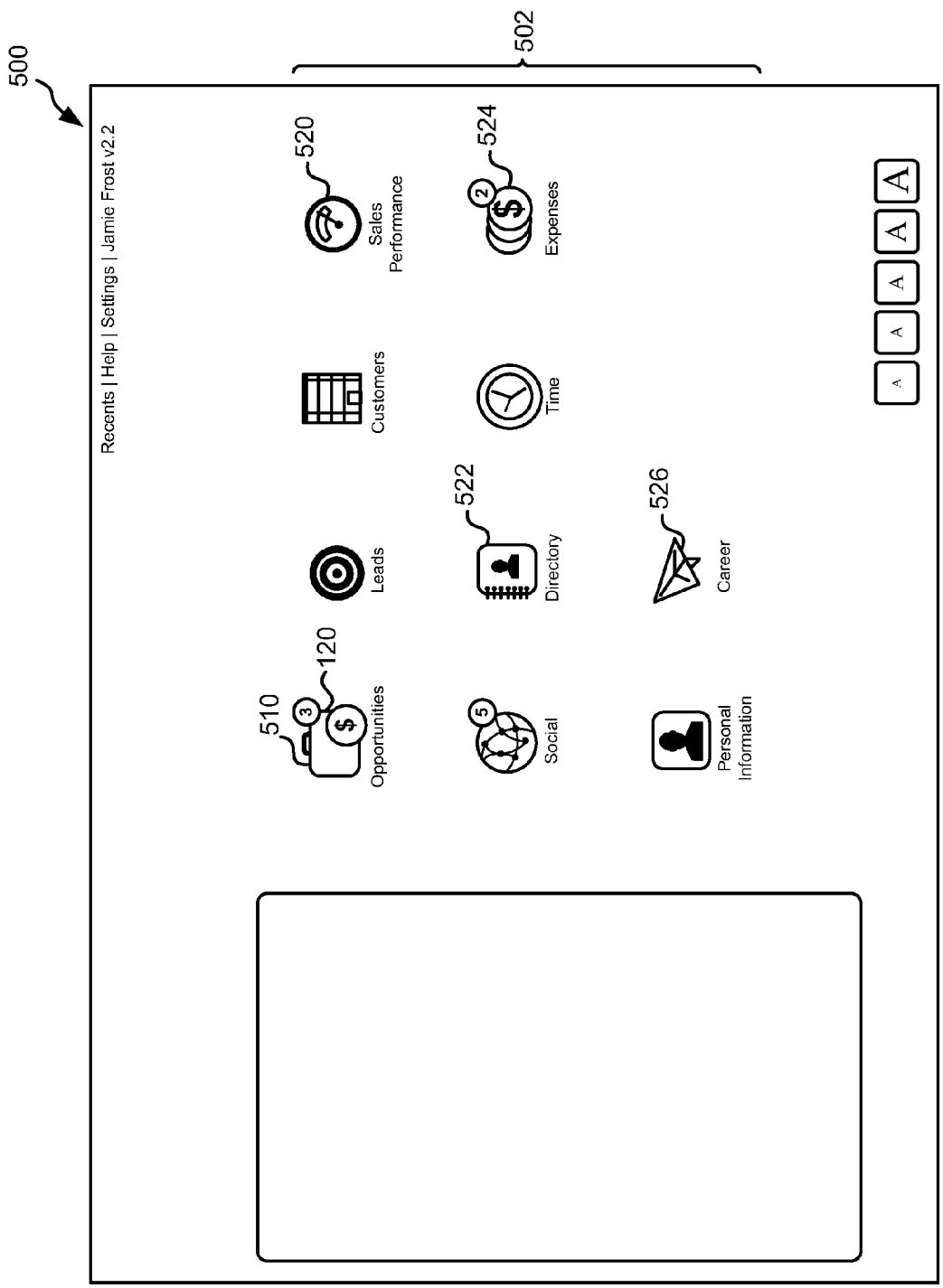
FIG. 18 illustrates a Root-level Home Screen showing icons for available applications.

FIG. 18 illustrates a home page or main view 500 in a particular embodiment of a simple user interface. Icons at area 502, such as icons 510, 520 can allow accessing of applications and business flows. A business flow includes a business process that a user goes through to achieve a business goal e.g., Managing Pipeline or something more specific such as "Research a Customer". In a business flow a location can include information coming from multiple applications or external sources. The applications or sources can be from a single or multiple different manufacturers. So for example, in a customer overview in a CRM application there may be tabs at the location to show public information (stock or financial information) coming from different sources. Profile, Sales Account Team, Opportunities, Leads for a particular customer page can each come from a different application and/or source.]

Main View 500 pulls together applications across pillars and products, such as Human Capital Management (HCM), Expenses and Sales, etc. Selecting an application can open a fully functional transactional page. Also as a result of selecting an icon, the icons become re-arranged to the top of the page.

Figure 19:
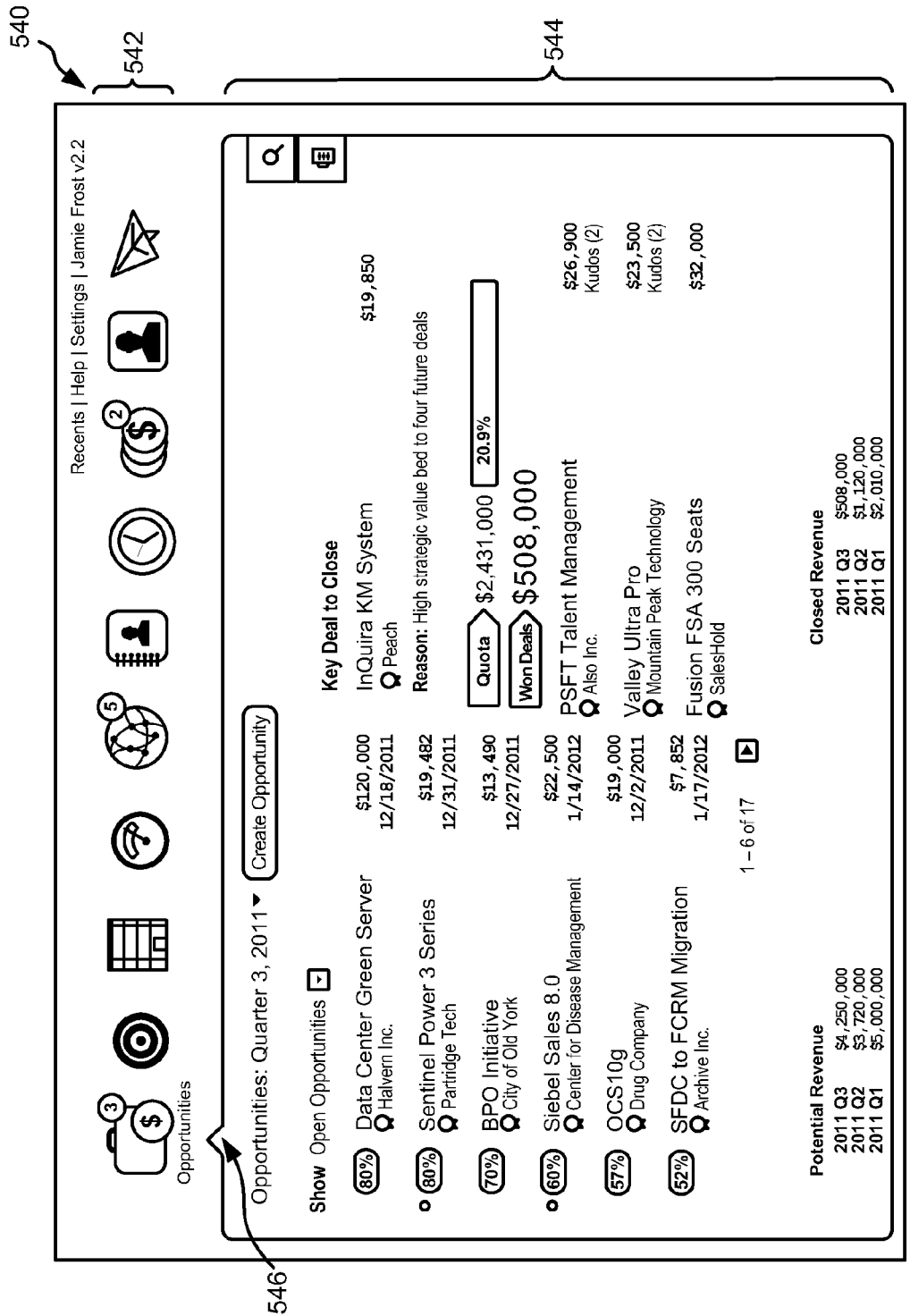
FIG. 19 shows an "Opportunities" page.

For example, selecting Opportunities icon 510 results in a secondary view, view 500, shown in FIG. 19. In FIG. 19, the icons from the larger, rectangular grid area 500 are arranged into a strip or row at top area 542. The same icons are displayed in their same relative ordering. However, in other embodiments, only a portion of the icons need be replicated and the ordering could change. Since Opportunities was selected, the larger screen area 544 below top area 542 is used to display a location in an application associated with the Opportunities icon. As shown in FIG. 19, the location is an active page view of the "open opportunities" and other related information for the current user.

Figure 20:
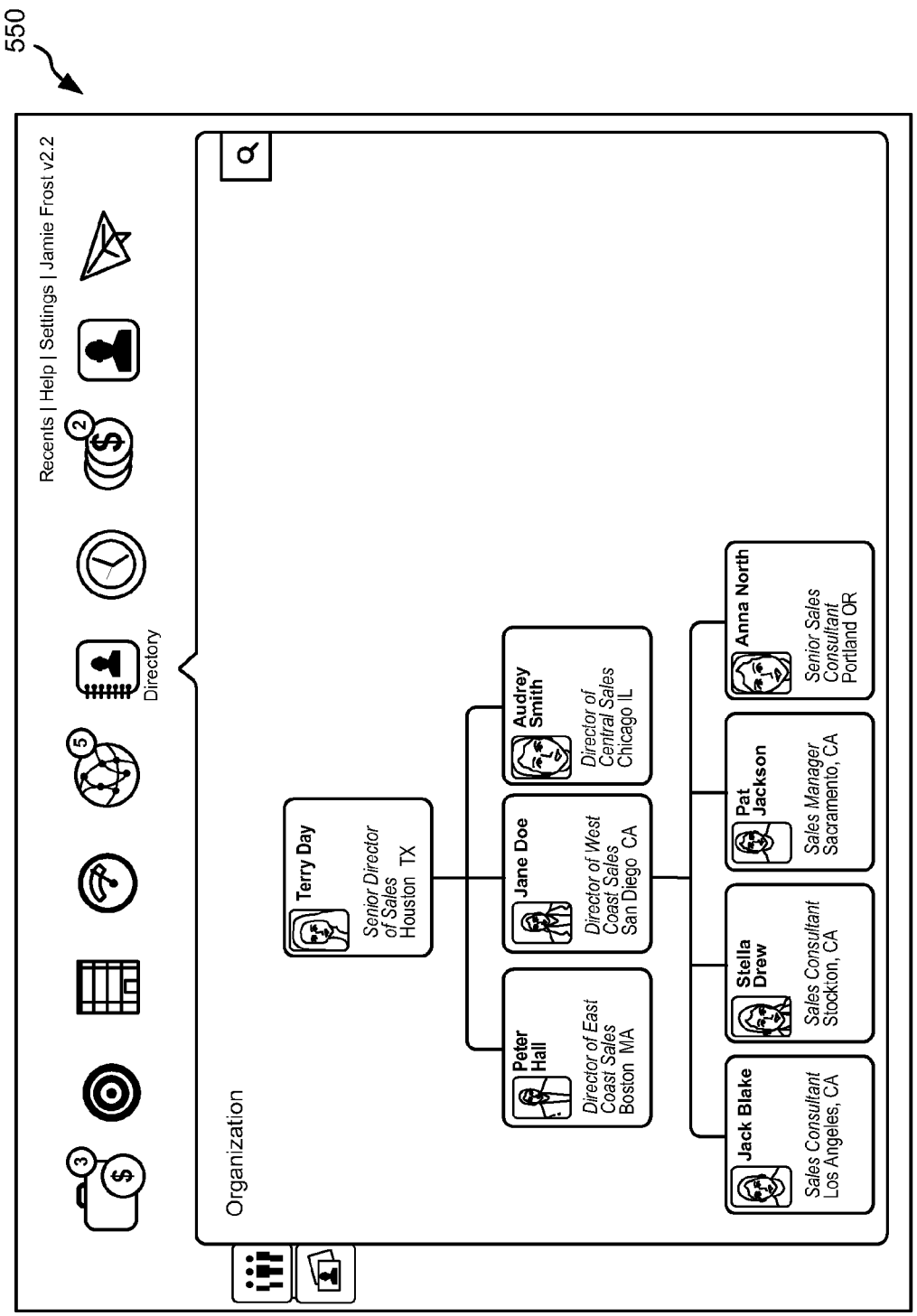
FIG. 20 shows a "Directory" page.

Selecting Directory icon 522 results in the display of FIG. 20 showing secondary view 550. In this case, an organization ("org") chart from an HCM application is opened. The org chart comes from a HCM application. Another tab that is not selected is a contact management tab that comes from a different application. If the contact management tab is selected then the display changes to show a display generated by, or using information from, the contact management application which is a different application from the HCM application.

Figure 21:
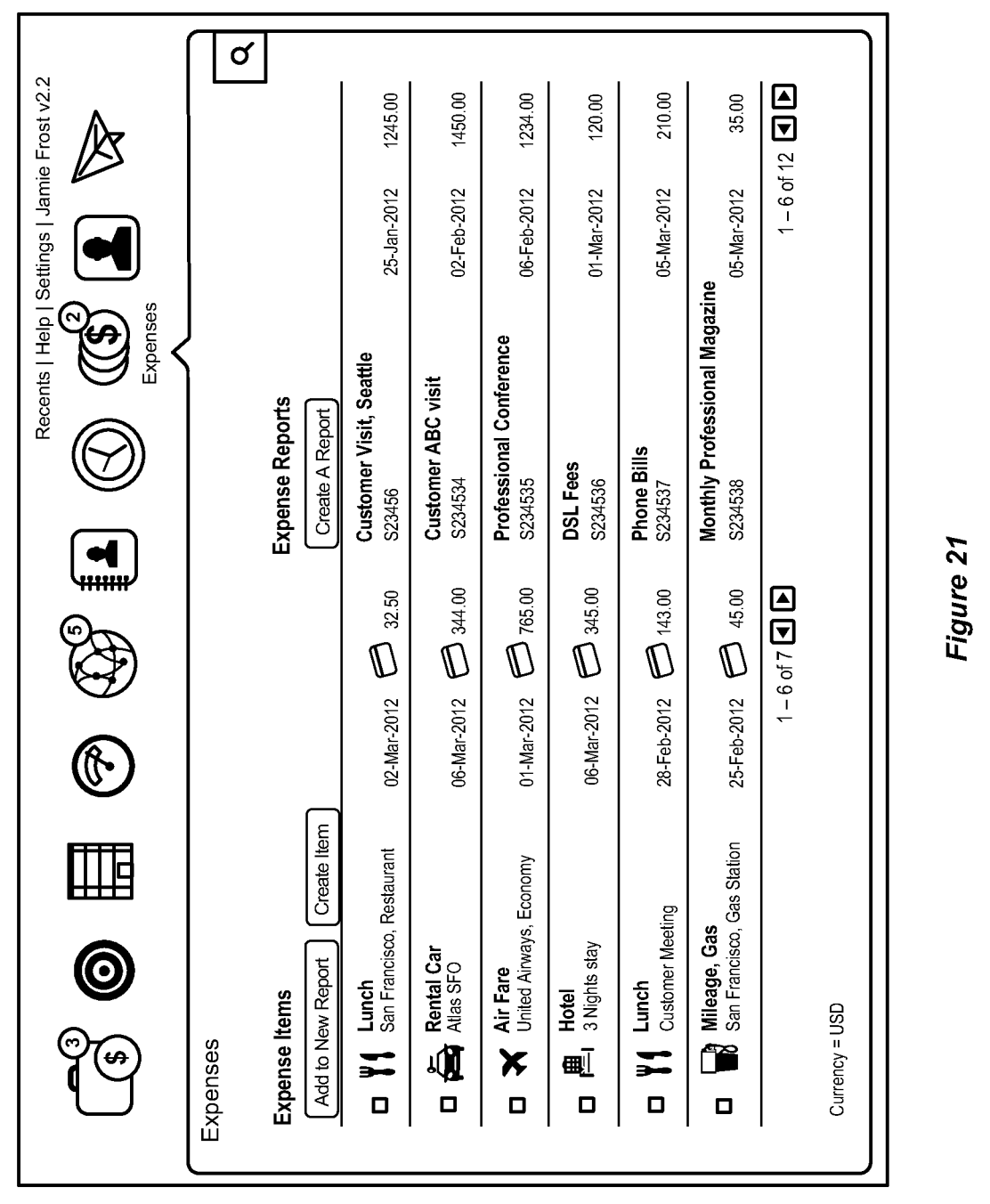
Figure 23:
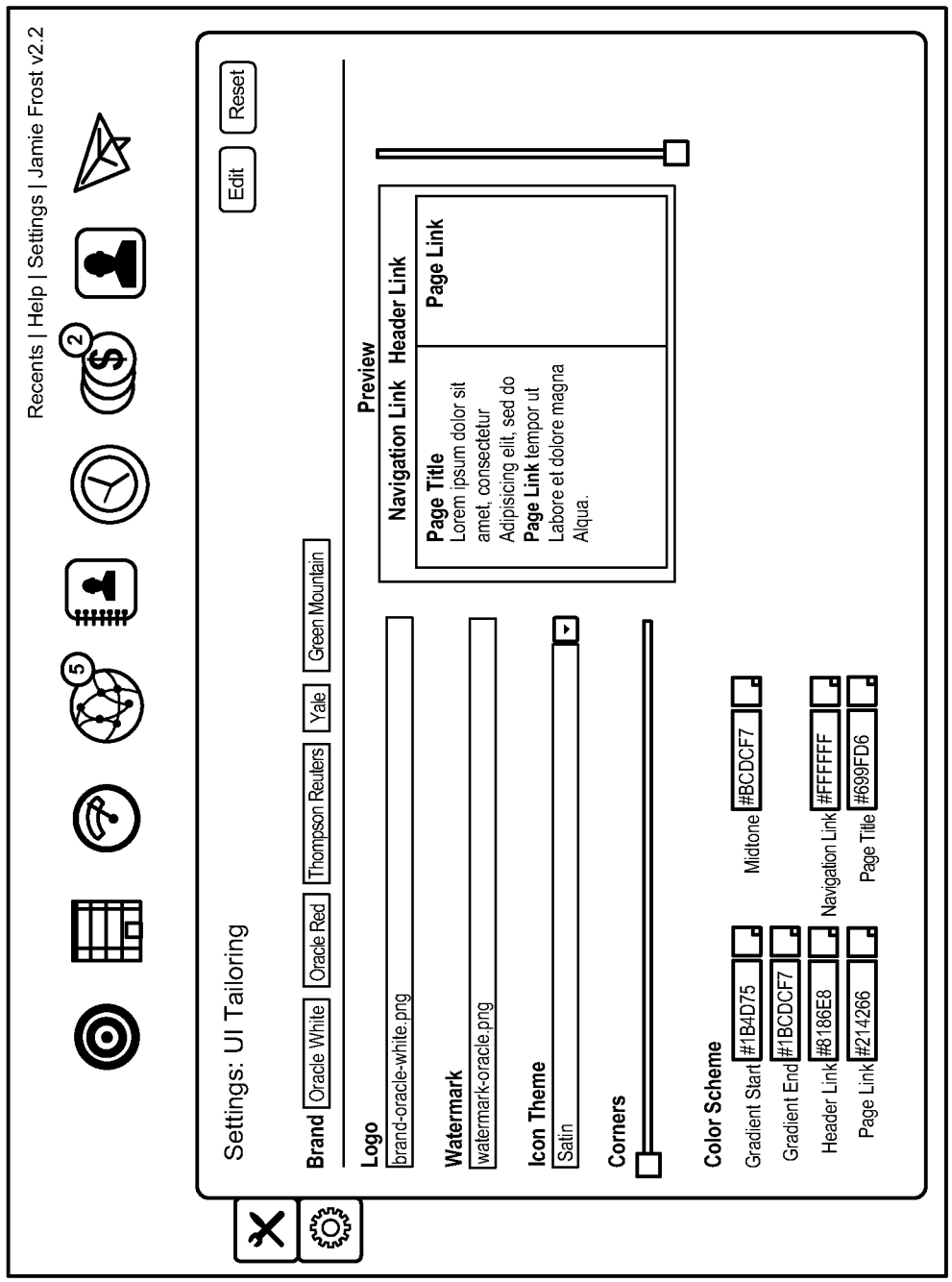
FIG. 23 shows a "Settings" page including skin personalization alternatives.

Selecting Expenses icon 524 from main view 500 opens a transactional page listing personal expenses to create the secondary view as shown in FIG. 21. Selecting Career icon 526 opens a career planning page shown in FIG. 22, where job qualifications can be monitored and searched. FIG. 23 shows controls for changing setting such as user interface tailoring to change the style or look of the interface. The style or look of the user interface, sometimes referred to as the "skin," can be easily personalized and customized by end users or administrators ("admins") directly on a live environment. An admin, for example, could select a default color scheme, logo, and other elements for a particular customer or industry. In a particular embodiment, various skin personalization attributes are exposed using one or more side tabs.

Note that selecting an icon from either the main view or from one of the secondary views serves to generate the secondary view associated with that icon. In each secondary view there is a visual cue, such as tag arrow 546 of FIG. 19, to show which icon the larger screen area display corresponds to.

FIGS. 24-26 illustrate a feature whereby a user can switch between applications, or "punchout" from an application to another. FIG. 24 shows a filesystem running under a Filesystem in Userspace (FUSE) module. FIG. 25 shows the display after the user has clicked on an entry, "Adv Corp" in FIG. 24. The display in FIG. 25 shows a profile for the selected entry that provides details such as may be needed by a sales rep. Both displays of FIGS. 24 and 25 are generated by the FUSE module. Also shown in FIG. 24 is More Details punchout button 562 that is a menu selection made available under Actions 560. The punchout button 562 includes a double-arrow icon. This double arrow icon is used to denote a punchout wherein the user is leaving FUSE. In a particular embodiment, every time a control will take the user out of the current application into another application the control is marked with the double-arrow icon.

Upon selecting More Details punchout button 562 in FIG. 24, a separate application is launched. In this case it is a Fusion application manufactured by Oracle, Corp. The screen for the Fusion application is shown in FIG. 26. The Fusion application is provided with information on which profile the user was viewing when the punchout was selected. This allows the Fusion application to provide additional information to the user about the entry that was the subject of the user's display in the previous application (FUSE, in this example).

Home button 570 is provided so that the user can return to the original application. In this example, when the user presses or activates the home button, the user is returned to the main or home screen in the original application. In other words, the user would be returned to the screen display of FIG. 24.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for accessing functionality of applications in a computer system, the method comprising:
    configuring at least one of a plurality of active thumbnail images as an active control panel containing one or more active control regions embedded within the active thumbnail image,
    wherein the one or more active control regions of each active thumbnail image are configured to provide access to functionality of an application, the application comprising a workflow application, and
    wherein the active control regions are configured to provide the same functionality independent of an interface native to the application;
    displaying the at least one active thumbnail in response to a user request;
    receiving a control signal with respect to a specific active control region embedded in the at least one active thumbnail; and upon receiving the control signal, operating the configured functionality of the application using the active thumbnail image independent of the interface native to the application.

2. The method of claim 1, wherein operating at least some of the functionality of the application using the one or more of the active control regions independent of the interface native to the application comprises operating at least some of the functionality of the application without opening the application.

3. The method of claim 2, wherein operating at least some of the functionality of the application using the one or more of the active control regions independent of the interface native to the application comprises operating at least some of the functionality of the application while the application remains closed.

4. The method of claim 1, further comprising:
accepting a signal from a user input device to indicate selection of an active control region within a particular active thumbnail image; and
causing an application program associated with the particular active thumbnail image to perform an action associated with the selected active control region independent of the interface native to the application.

5. The method of claim 1, wherein the selected active thumbnail image is configured as a requisition approval request active control panel.

6. The method of claim 5, wherein the active thumbnail image configured as a requisition approval request active control panel includes an active control region to approve a requisition approval request.

7. The method of claim 1, wherein operating at least some of the functionality of the application using the one or more of the active control regions independent of the interface native to the application comprises operating at least some of the functionality of the application without invoking operating system functionality that opens the application.

8. The method of claim 1, further comprising:
providing a control allowing a user to associate a plurality of icons with a plurality of active thumbnail images.

9. The method of claim 8, further comprising:
providing a control allowing a user to edit the association between the plurality of icons and the plurality of active thumbnail images.

10. The method of claim 1, further comprising:
providing a control allowing a user to add additional active control regions to the active thumbnail image plurality of active control regions.

11. The method of claim 10, further comprising:
providing a control allowing a user to edit the active thumbnail image.

12. An apparatus for navigating among a plurality of objects in a computer system, the apparatus comprising:
at least one processor coupled to a display device;
a processor readable storage device including one or more instructions executable by the processor for:
configuring at least one of a plurality of active thumbnail images as an active control panel containing one or more active control regions embedded within the active thumbnail image,
wherein the one or more active control regions of each active thumbnail image are configured to provide access to functionality of an application, the application comprising a workflow application, and
wherein the active control regions are configured to provide the same functionality independent of an interface native to the application;
displaying the at least one active thumbnail in response to a user request;
receiving a control signal with respect to a specific active control region embedded in the at least one active thumbnail; and
upon receiving the control signal, operating the configured functionality of the application using the active thumbnail image independent of the interface native to the application.

13. A non-transitory processor-readable storage including one or more instructions executable by the processor for:
configuring at least one of a plurality of active thumbnail images as an active control panel containing one or more active control regions embedded within the active thumbnail image,
wherein the one or more active control regions of each active thumbnail image are configured to provide access to functionality of an application, the application comprising a workflow application, and
wherein the active control regions are configured to provide the same functionality independent of an interface native to of the application;
displaying the at least one active thumbnail in response to a user request;
receiving a control signal with respect to a specific active control region embedded in the at least one active thumbnail; and
upon receiving the control signal, operating the configured functionality of the application using the active thumbnail image independent of the interface native to the application.

* * * * *

UNITED STATES PATENT AND TRADEMARK OFFICE
CERTIFICATE OF CORRECTION

PATENT NO.         : 9,448,693 B2  
APPLICATION NO.    : 13/843126  
DATED              : September 20, 2016  
INVENTOR(S)        : Bhowmick et al.

Page 1 of 1

It is certified that error appears in the above-identified patent and that said Letters Patent is hereby corrected as shown below:

On the Title Page

Column 1, under Inventors, Line 9, delete "Healdsburgh," and insert -- Healdsburg, --, therefor.

In the Drawings

On sheet 8 of 24, in Figure 9, under Reference Numeral 180, Line 5, delete "Amercia" and insert -- America --, therefor.

On sheet 14 of 24, in Figure 15, Line 2, delete "Reccomendation" and insert -- Recommendation --, therefor.

On sheet 15 of 24, in Figure 16, Line 1, delete "Menu Moblie" and insert -- Menu Mobile --, therefor.

In the Specification

In Column 1, Line 43, after "home menu" insert -- ; --.

In Column 1, Line 44, after "framework" insert -- ; --.

In Column 2, Line 15, delete "etc.," and insert -- etc. --, therefor.

In Column 10, Line 42, delete "source.]" and insert -- source. --, therefor.

In the Claims

In Column 14, Line 40, in Claim 13, after "to" delete "of".

Signed and Sealed this  
Fifteenth Day of August, 2017

Joseph Matal  
*Performing the Functions and Duties of the*  
*Under Secretary of Commerce for Intellectual Property and*  
*Director of the United States Patent and Trademark Office*